Dec. 9, 1958 C. E. LOMAX 2,863,949

TELEPHONE SYSTEM

Original Filed Sept. 13, 1952 9 Sheets-Sheet 1

INVENTOR.
CLARENCE E. LOMAX
BY C. R. Sipe
ATTY.

CONFERENCE RELAYS

INVENTOR.
CLARENCE E. LOMAX
BY C. R. Sieper
ATTY.

TELEPHONE SYSTEM

Original Filed Sept. 13, 1952

LINK CIRCUIT

INVENTOR.
CLARENCE E. LOMAX
BY C. R. Sipe
ATTY.

Dec. 9, 1958 C. E. LOMAX 2,863,949

TELEPHONE SYSTEM

Original Filed Sept. 13, 1952 9 Sheets-Sheet 4

LINK CIRCUIT

INVENTOR.
CLARENCE E. LOMAX
BY C. R. Sipes
ATTY.

Dec. 9, 1958 C. E. LOMAX 2,863,949

TELEPHONE SYSTEM

Original Filed Sept. 13, 1952 9 Sheets-Sheet 5

LINK CIRCUIT

INVENTOR.
CLARENCE E. LOMAX
BY C. R. Sipe
ATTY

*INVENTOR.*
CLARENCE E. LOMAX
BY C. R. Sipe
ATTY.

Dec. 9, 1958 C. E. LOMAX 2,863,949

TELEPHONE SYSTEM

Original Filed Sept. 13, 1952 9 Sheets-Sheet 7

CODE CALL & CONFERENCE UNIT

INVENTOR.
CLARENCE E. LOMAX

BY C. R. Sipe

ATTY.

Dec. 9, 1958 C. E. LOMAX 2,863,949

TELEPHONE SYSTEM

Original Filed Sept. 13, 1952 9 Sheets-Sheet 8

CODE CALL & CONFERENCE UNIT

INVENTOR.
CLARENCE E. LOMAX

BY C. R. Sipe

ATTY.

TELEPHONE SYSTEM

Original Filed Sept. 13, 1952

9 Sheets-Sheet 9

CODE CALL SENDER CIRCUIT

INVENTOR.
CLARENCE E. LOMAX
BY C. R. Sipe
ATTY.

United States Patent Office 2,863,949

Patented Dec. 9, 1958

2,863,949

TELEPHONE SYSTEM

Clarence E. Lomax, Hastings, Nebr., assignor to General Telephone Laboratories, Incorporated, Chicago, Ill., a corporation of Delaware Original application September 13, 1952, Serial No. 309,476. Divided and this application May 28, 1957, Serial No. 662,092

10 Claims. (Cl. 179—18)

The present invention relates in general to automatic or semi-automatic telephone systems and more particularly to private automatic telephone exchanges. This application is a division of the copending application of Clarence E. Lomax, Serial No. 309,476, filed September 13, 1952, now Patent No. 2,824,909.

The principal object of the invention resides in the provision of a simple connector comprising two component switches, especially for use in private automatic exchanges in which special services of one kind or another are provided.

With this object in mind the main feature of the invention resides in the provision of a connector having two component switches set by numerical impulses, the wipers of one switch being reached over the wipers and contacts of the other switch. Both of these switches may be single motion switches in which case one switch may serve as a tens switch and the other as a units switch. The tens switch may have some or all of the following functions: connect the calling side of the connector with the wipers of the units switch either with or without line reversal, thereby to provide for party selection; select a given set of wipers of the units switch; set the units switch on one of a number of start positions preceding a desired one or desired ones of a number of groups of subscribers' lines connected to the bank contacts of the units switch; provide for direct access, to the exclusion of the units switch, to a trunk line such as a special service calling trunk or a code call answering trunk or both.

In this manner the connector switch to which the subscribers' lines are connected may be of simple construction and relatively small capacity and the number of relays associated with each connector may be limited. Thus a plurality of special services may be provided without unduly increasing the cost of the connector circuits.

In the embodiment of the invention shown herein the invention is illustrated in connection with a private automatic exchange including a special service apparatus which is used in common for both code calls and conference calls, the features relating to this aspect of the subject matter being claimed in the parent application Serial No. 309,476.

More particularly the registering or selecting means which are provided in the code call apparatus to record the identity of the party to be code-called also serve as a means to make the equipment used in setting up a conference effective if this latter service rather than code call service is desired by the calling party.

A plurality of sets of group conference relays are provided, each set of these relays functioning when selected to set up a conference between a fixed group of subscribers. In this case the aforementioned code call registering means may be utilized, to select the particular relay set, that is the particular conference group, desired in a given conference call. In this manner only a single set of bank contacts in the connectors is required to provide a calling connection to the special service apparatus, in spite of the fact that not only code calls but also conference calls to any desired one of a number of groups may be set up over this calling number. This is of particular advantage in private automatic exchanges of relatively small capacity in which only a limited number of contact positions are available in the connectors.

In private automatic exchanges with code call facilities it is customary to provide, in addition to the code call calling connection a code call answering connection to the code call apparatus, together with a talking path interconnecting these two connections. Thus, when the party desired in a code call upon hearing his characteristic code dials the answering number from the nearest telephone he may enter into conversation with the party that originated the code call. At least a part of this code call talking path, preferably including the calling bridge associated therewith, is utilized in the case of conference calls to connect the conference originating party with the conference talking path set up by the conference equipment. In this manner the party originating the conference call, for example the secretary of an executive may converse with the parties of the conference group called although she herself is not a member of this group, provided only that she is not restricted from access to the special service apparatus.

Moreover, in the system described herein means are provided for actuating the code call sender associated with the special service apparatus to transmit a special code alarm; this special code alarm overrides a regular code call but does not interfere with conference calls, that is a code alarm may be initiated and transmitted while a conference is in progress.

The invention both as to its organization and method of operation, together with other objects and features thereof, will best be understood by reference to the following specification taken in connection with the accompanying drawings.

Figure 3:
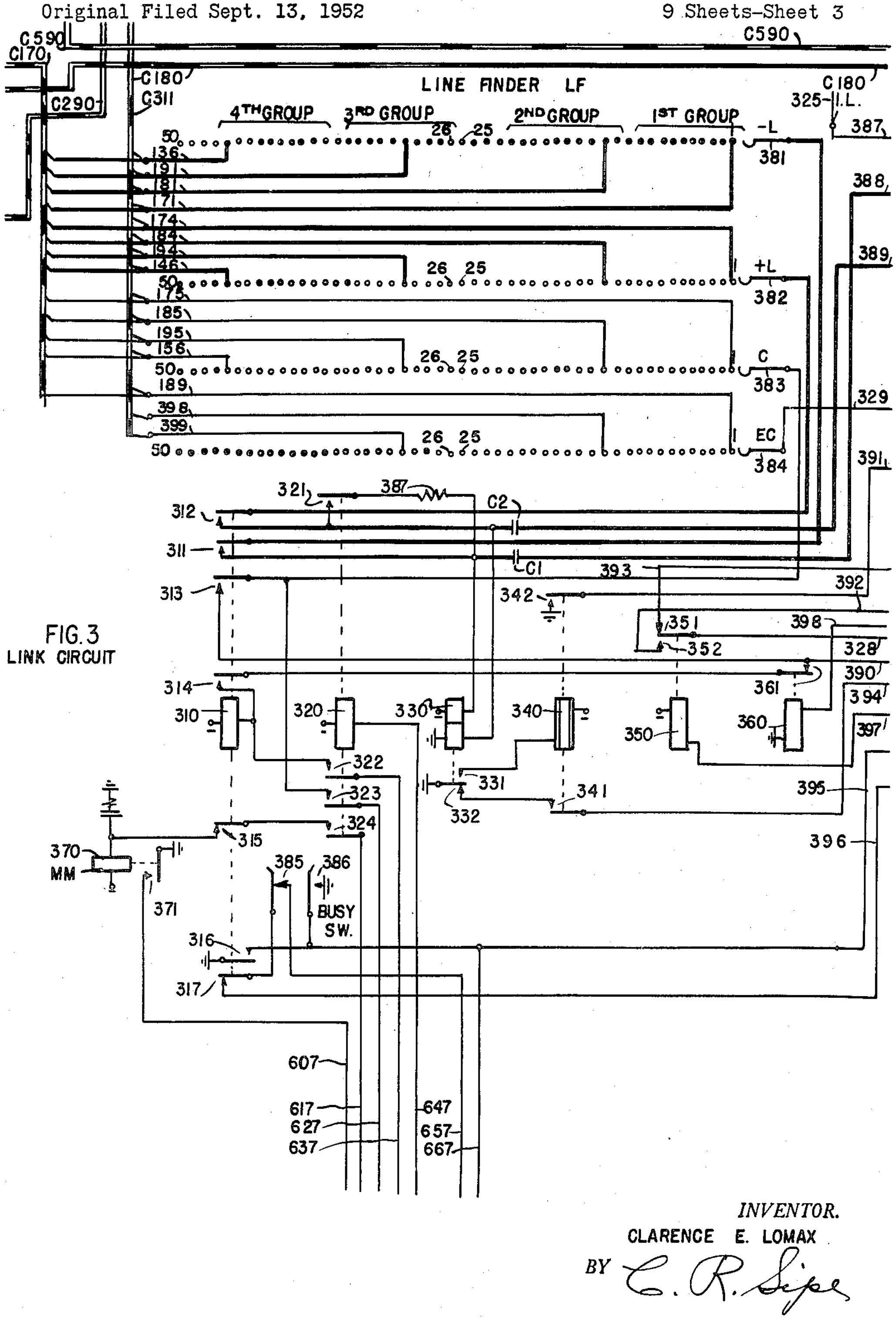
Figure 4:
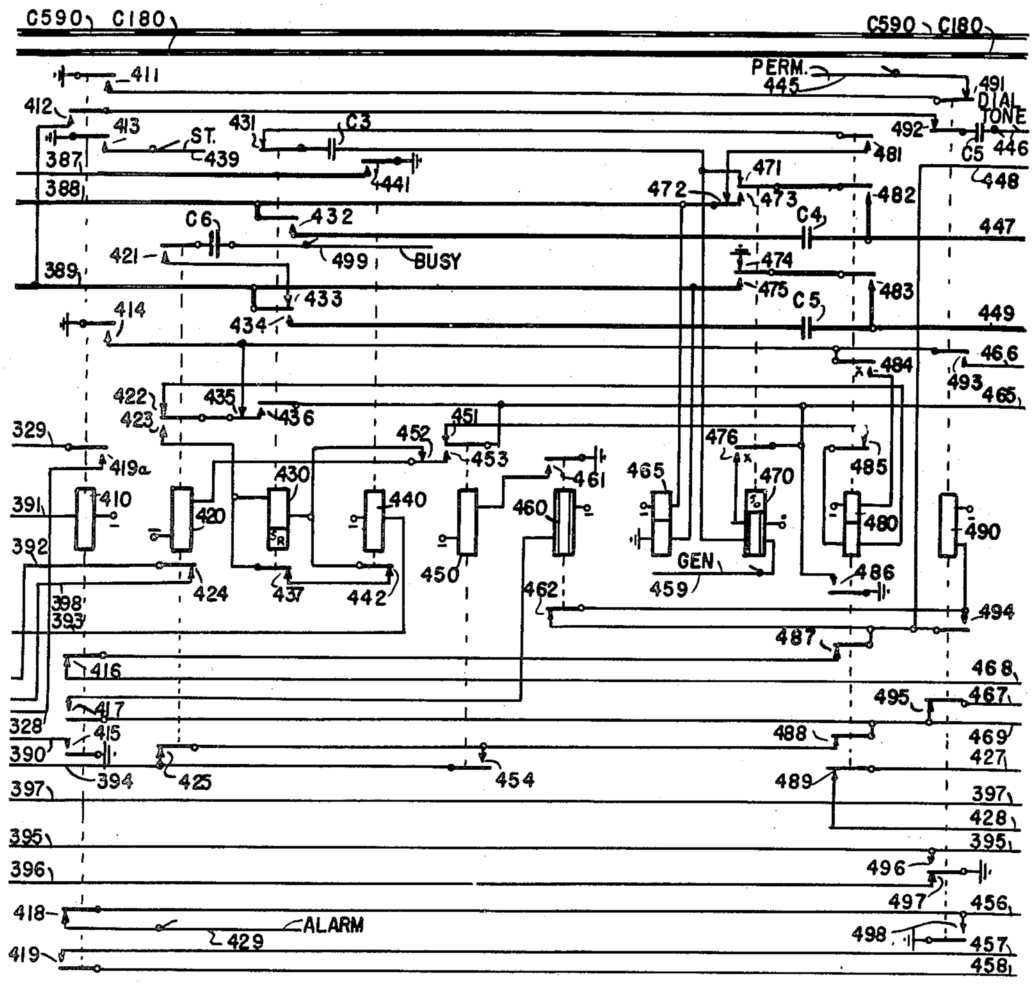
Figure 5:
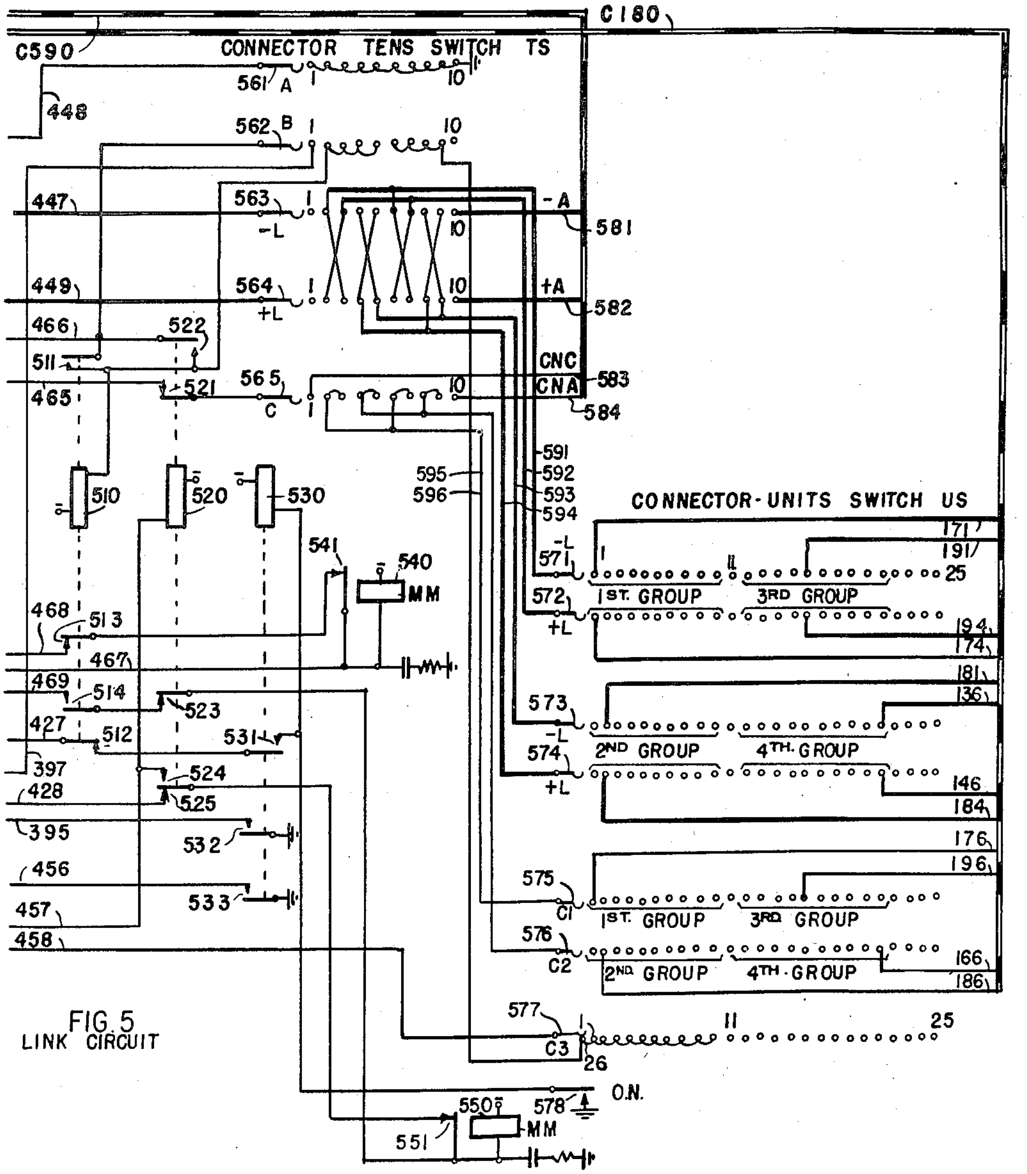
Figures 6, 10:
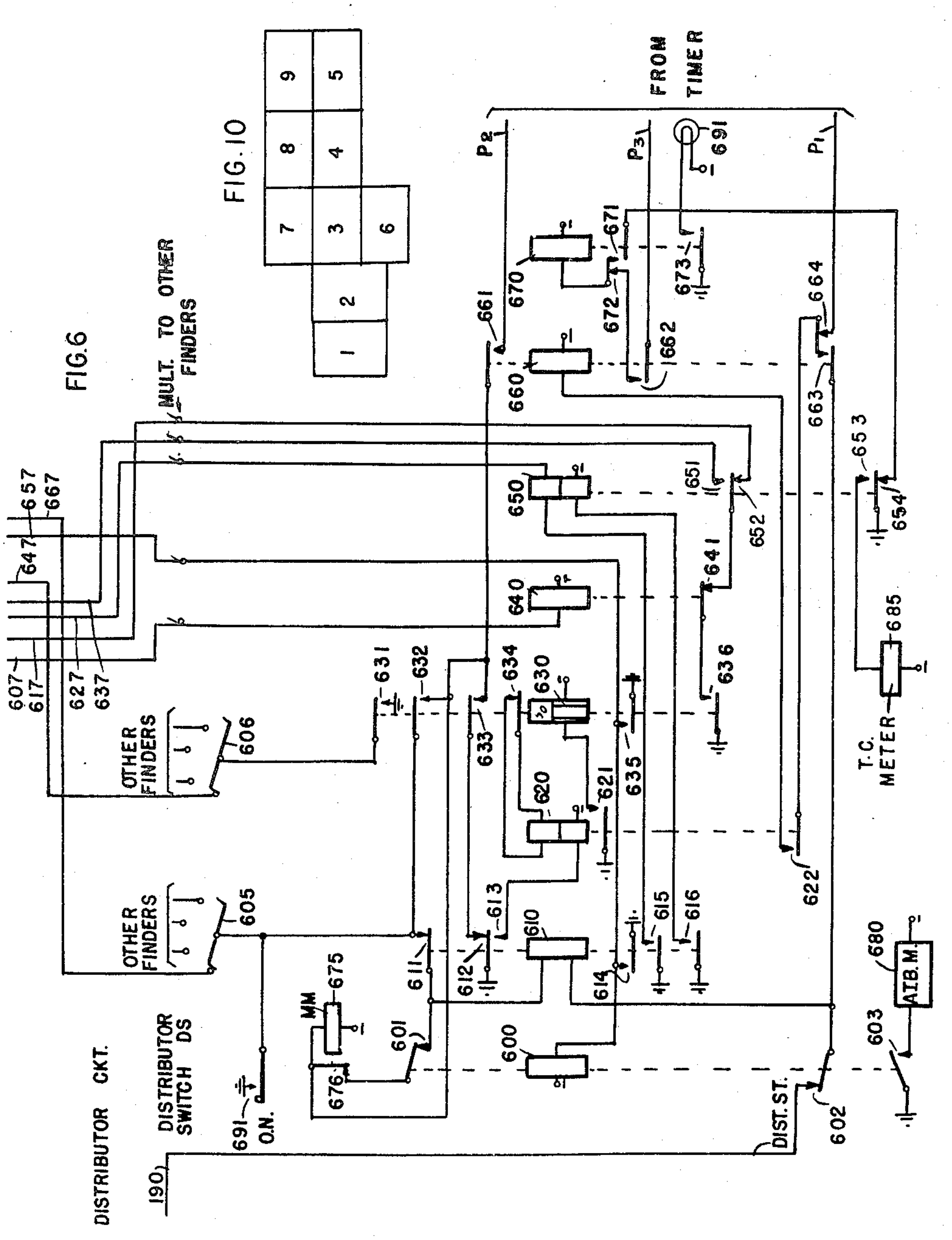
Figure 7:
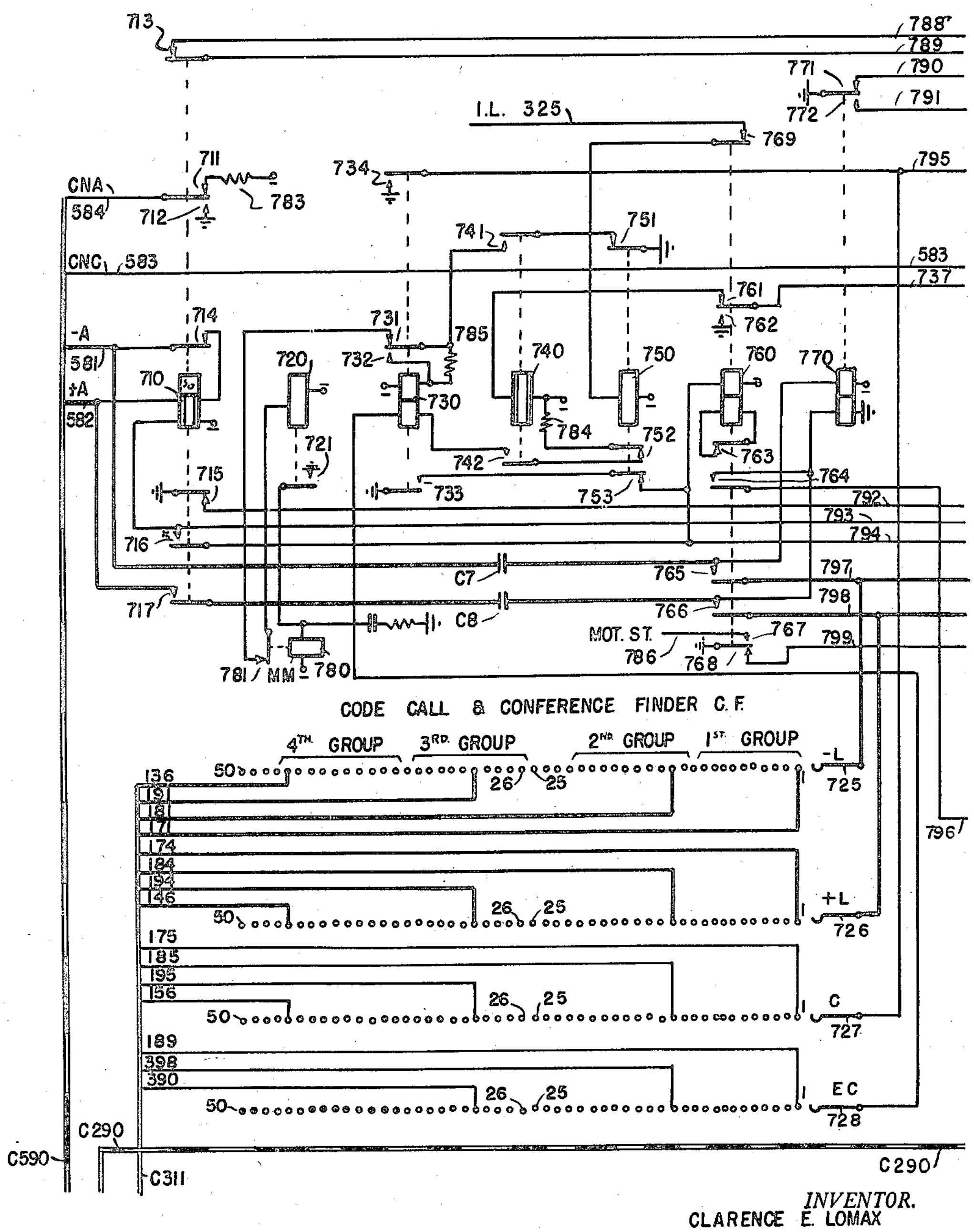
Figure 8:
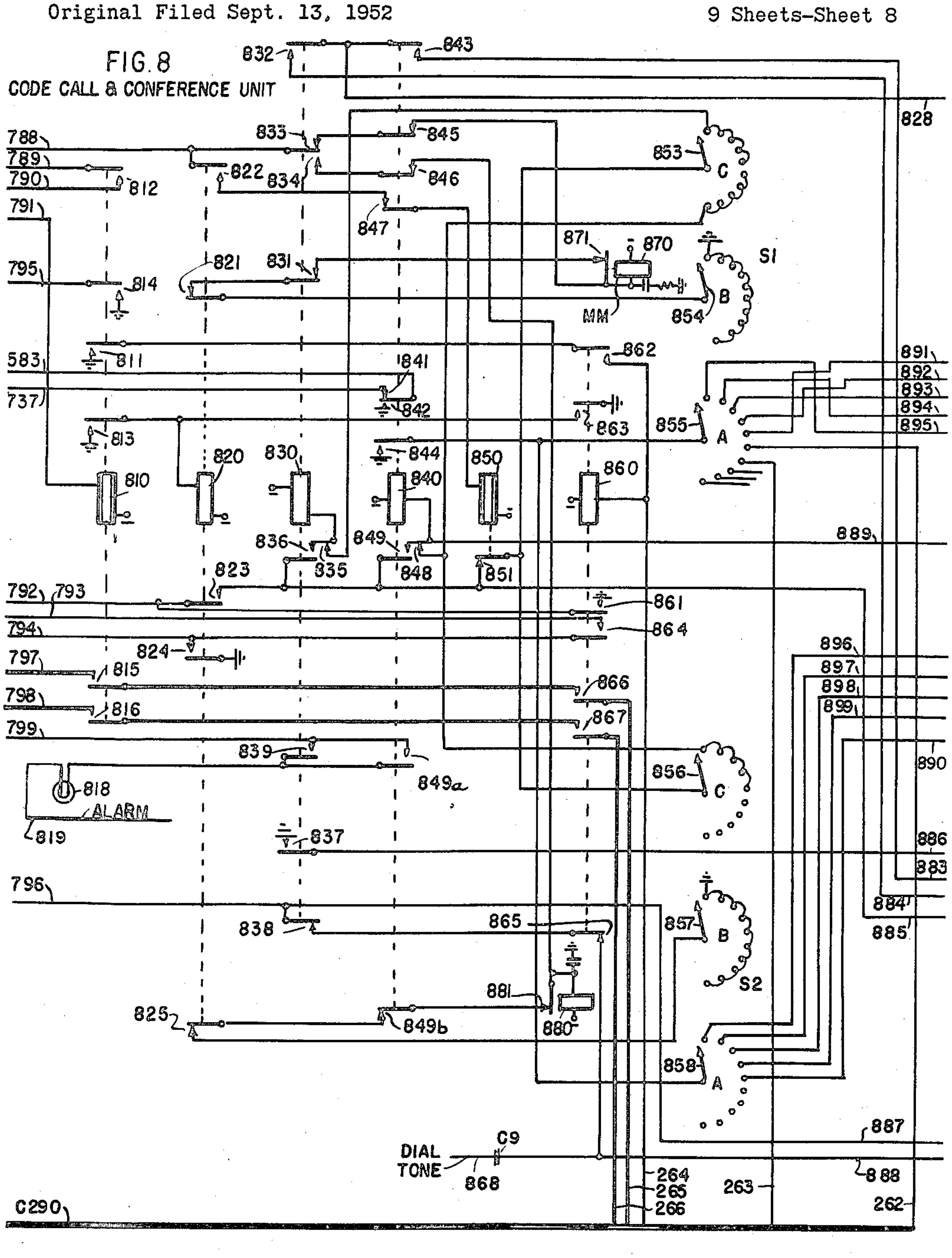
Figure 9:
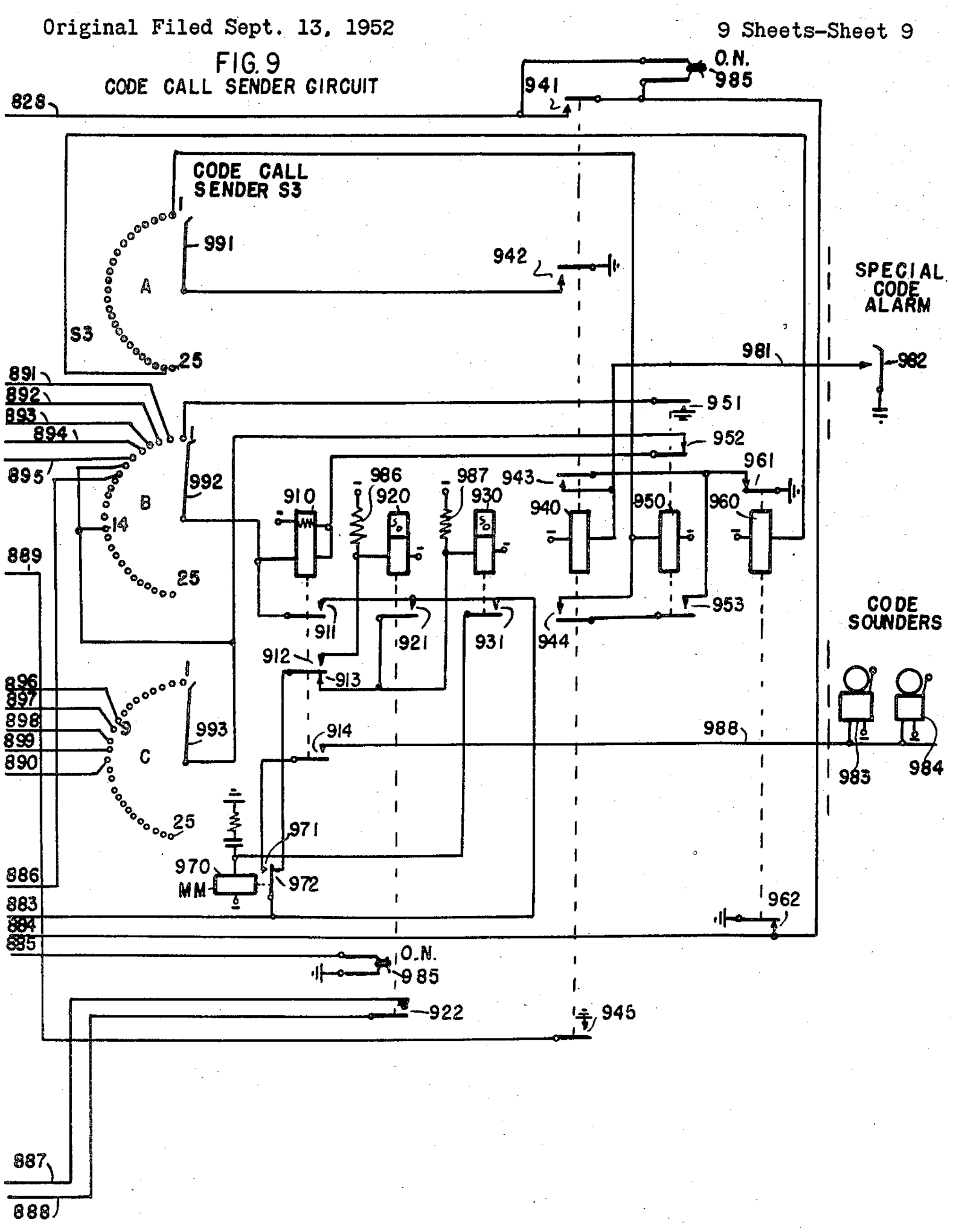

Figs. 3, 4 and 5 when taken together represent a circuit diagram of a line finder-connector link of the aforementioned private automatic exchange;

Fig. 6 is a circuit diagram of the distributor associated with the finder-connector links of this exchange;

Figs. 7 and 8 when taken together form a circuit diagram of a combined code call and conference apparatus associated with the aforementioned private automatic exchange;

Fig. 9 is a circuit diagram of a code call sender associated with the apparatus illustrated in Figs. 7 and 8; and Fig. 10 illustrates how Figs. 1–9 should be placed relatively to each other in order to show a unified system.

Figure 1:
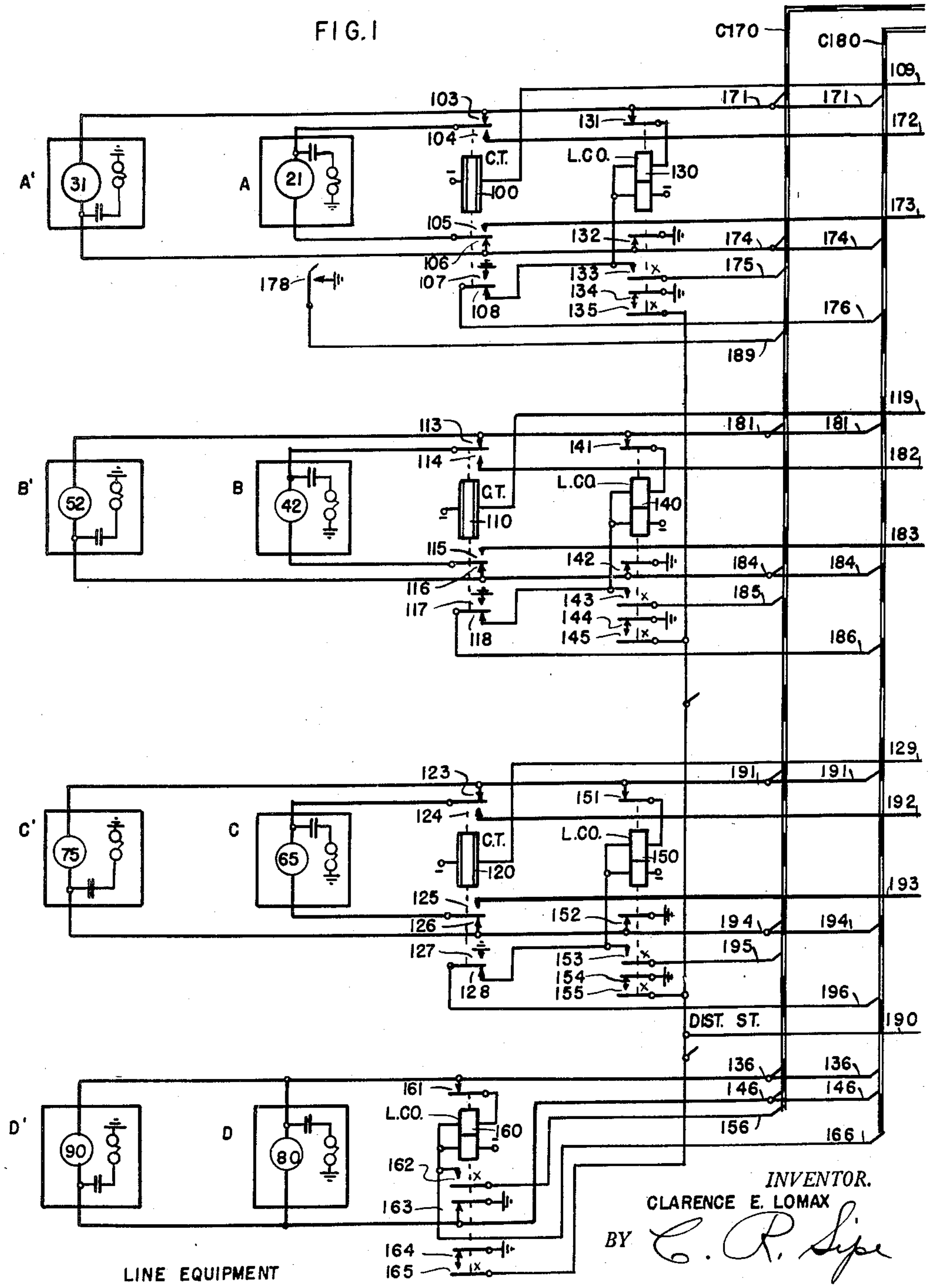
Fig. 1 is a circuit diagram of four party lines connected to a private automatic exchange, together with the line equipment of these four lines and the two subscribers' stations connected to each line, these stations being shown in schematic form only.

A brief description of the embodiment of the invention as illustrated in the drawings will first be given. The private automatic exchange shown herein relies for the establishment of telephone connections between the subscribers connected thereto on a number of finder-connector links such as that represented in Figs. 3–5, these links being served by the distributor circuit illustrated in Fig. 6. The capacity of this automatic exchange is assumed to be forty subscribers' lines which may be individual lines or two-party lines of the side-of-line signaling type, the four lines shown in Fig. 1 being all party lines. As shown in Figs. 1, 3 and 5 these four lines are connected, by way of talking conductors 172, 173; 182, 183; 192, 193; and 136, 146, respectively, to the finder banks over cable C170 and to the connector banks over cable C180. Conductors 175, 185, 195 and 156 are the control conductors connecting the respective line equipments with the finder banks, and conductors 176, 186, 196 and 166 are the control conductors connecting the respective line equipments with the connector banks.

Upon the initiation of a call at a subscribers station, say station D, Fig. 1, the combined line and cutoff relay, in the instant example 160, Fig. 1, which is of the 2-step type, partially operates to close a starting circuit to the distributor, Fig. 6, which is of the link-preselecting type. The distributor switch, DS, shown in the upper portion of Fig. 6 is a rotary stepping switch having any convenient number of positions as required by the number of links served by the distributor. Assuming that the wipers of distributor switch, DS, rest on a set of contacts associated with an idle finder-connector link such as that shown in Figs. 3–5, the line finder, Fig. 3, of that link which is assumed to be a 51-position single motion stepping switch will be caused to search for the calling line. If this line is found, the line cut-off relay operates fully to disconnect itself from the talking conductors and open the aforementioned start circuit, the line finder switches the calling party through to the impulse relay, 330, of the finder-connector link and the distributor switch advances its wipers to a set of contacts associated with an idle link in preparation for another call.

The connector used in each of the link circuits includes two component switches, one switch, TS, Fig. 5, serving as a tens switch and the other, US, Fig. 5, as a units switch. It may be mentioned at this point that the distributor switch, Fig. 6, the line finder switch, Fig. 3, the tens and units switches, Fig. 5, and the stepping switches shown in Figs. 8 and 9 are all single motion stepping switches of the type in which the wipers are advanced upon the deenergization of the stepping magnet.

Units switch US, Fig. 5, is a 26-position switch with two sets of wipers and contact rows; each of these two sets of contact rows accommodates two groups of ten subscriber lines respectively connected to positions 1–10 and 12–21 of the switch. The normal or home position, 26, of the switch serves as a start position for one of the groups and position 11 for the other. It will be clear therefore that if the switch is in its home position its wipers may be advanced upon receipt of the units digit to any of the subscribers' lines connected to positions 1–10 and if the switch is in position 11 its wipers may be set by such impulses on any of the subscribers' lines connected to positions 12–21.

The particular group of subscribers' lines desired in a given call is determined by the setting of the tens switch TS, that is according to the setting of the tens switch in response to the tens digit dialled this switch connects the calling side of the connector circuit over its wipers and bank contacts with one or the other of the two wiper sets of the units switch; and if the call is to a subscriber's line connected to one of positions 12–21 of the units switch it also causes this last mentioned switch to be automatically advanced to start position 11 in the interval between the tens and the units digits. In addition, tens switch TS is arranged for purposes of party selection to determine the side-of-line over which the ringing current is projected.

Thus referring to Fig. 5, if switch TS has been positioned on its position 2, in accordance with a tens digit 2, it connects the calling side of the connector circuit with the upper set of wipers of the units switch in a straightforward way so that ringing current which if the called line has been found idle is invariably applied to the negative wiper of the tens switch is projected over the negative wiper of the units switch and from there to the negative side of the called party line; and since with the tens switch in position 2 the automatic stepping circuit referred to above is not made effective, the units digit subsequently dialled into the connector will set the units switch on a line in the first tens group as indicated in Fig. 5. If this units digit for example is 1, it will readily be seen that station A, Fig. 1 which has the call number 21 and whose ringer is connected to the negative side of the line will be signaled. If switch TS has been set on its position 3 the same group of tens lines is selected but since the upper wipers of the units switch are connected to this position 3 of the units switch in a reverse way, ringing current will be projected over the positive side of the called line and, assuming that the same units digit 1 is dialled as before, the other party A', Fig. 1, on the called party line will be rung since the ringer of this station having the call number 31 is connected to the positive side of the line.

If the tens digit has been 4 and the tens switch accordingly positioned on its fourth position the lower wiper set of the units switch is connected up in a straightforward way and, since the automatic stepping circuit for the units switch is not closed in this position, the units digit, for instance 2, will set the units switch on the corresponding line of the second tens group, this group being connected to contacts 1–10 in the lower bank of the units switch as shown in Fig. 5. Station B, Fig. 1, which has the directory number 42 and whose ringer is connected to the negative side of the line will accordingly be rung. If on the other hand switch TS has been positioned on its position 5 the same group of subscribers' lines will be reached but because of the line reversal provided in this position ringing current will be transmitted over the other side of the line. Thus if the units digit again is 2, station B', Fig. 1, with the directory number 52 will be signaled.

Assuming now that the tens switch has been set on position 6 the upper set of wipers of the ringing switch will be connected up without line reversal as described above for position 2, but in the present instance a circuit is closed for relay 520, Fig. 5, which closes an automatic stepping circuit for magnet 550 of the units switch. The aforementioned circuit which extends over the B wiper and the strapping between contacts 6–9 of the associated contact row of switch TS and over the C3 bank and wiper of switch US to relay 520 is maintained, due to a corresponding strapping of the C3 bank of the units switch, until this switch has reached start position 11 in which it is arrested. As a result the wipers of the switch will be advanced in response to the units digit from this start position to one of positions 12–21 and accordingly a line connected to the third tens group selected. Assuming by way of example that the units digit is 5 it will be clear from the drawings that station C, Fig. 1, is signaled in this case. With tens switch TS positioned on position 7 a line in the same tens group will be reached but ringing current projected over the positive side of the line. Thus if the units digit dialled again is 5 the ringer at station C', Fig. 5, will be sounded.

If the tens digit is 8 or 9 the lower wiper set of the units switch is selected and again the switch automatically advanced to start position 11 so that a line in the fourth tens group is reached; the difference between tens digits 8 and 9 being that with the tens switch in position 8 ringing current is projected over the negative side of the line and with the tens switch in position 9 ringing current goes out on the positive side of the line. Thus if a calling subscriber, say at station A, Fig. 1, dials 80, station D will be rung since the ringer at this station is connected to the negative side of the line; and if he dials 90 instead, station D' will be signalled because at this telephone station the ringer is connected to the positive side of the line.

It will be understood from the foregoing remarks that all regular subscribers have two-digit numbers, the first digit ranging in value from 2 to 9. More particularly if the tens digit is 2, 3, 6 or 7 the upper wiper set of the units switch will be selected and if the tens digit is 4, 5, 8 or 9 the lower wiper set will be connected up; if the tens digit is 2, 3, 4, or 5 the units switch will not be moved out of its home position in the inter-digital interval but if the tens digit is 6, 7, 8 or 9 the units switch upon completion of the tens digit will be automatically stepped to its position 11; and if the tens digit is 2, 4, 6 or 8 ringing current will be sent over the negative side of the called subscriber's line but if it is 3, 5, 7 or 9, the ringing current will be transmitted over the positive side of the called line.

In each of the instances discussed above it was assumed that the called line was tested free by the connector. If on the other hand the called line is busy, busy relay 420, Fig. 4, will be operated and busy tone returned to the calling subscriber. Provisions are made in the embodiment described herein for permitting stations especially privileged to these services, for instance executives of a business establishment, to override this busy condition and thereby gain connection to the line called. Subscribers that are given such executive right-of-way privileges have the associated bank contact in the 4th or EC-contact row of the line finders wired to a non-locking key or push button at their telephone, such a push button designated by reference numeral 178 being schematically shown as provided at station A in Fig. 1. If the executive at this station upon hearing the busy tone depresses this button, relays 440 and 430, Fig. 4, operate in the finder-connector link to cut this subscriber through to the called line even though this last mentioned line is busy in an outgoing or incoming call.

Figure 2:
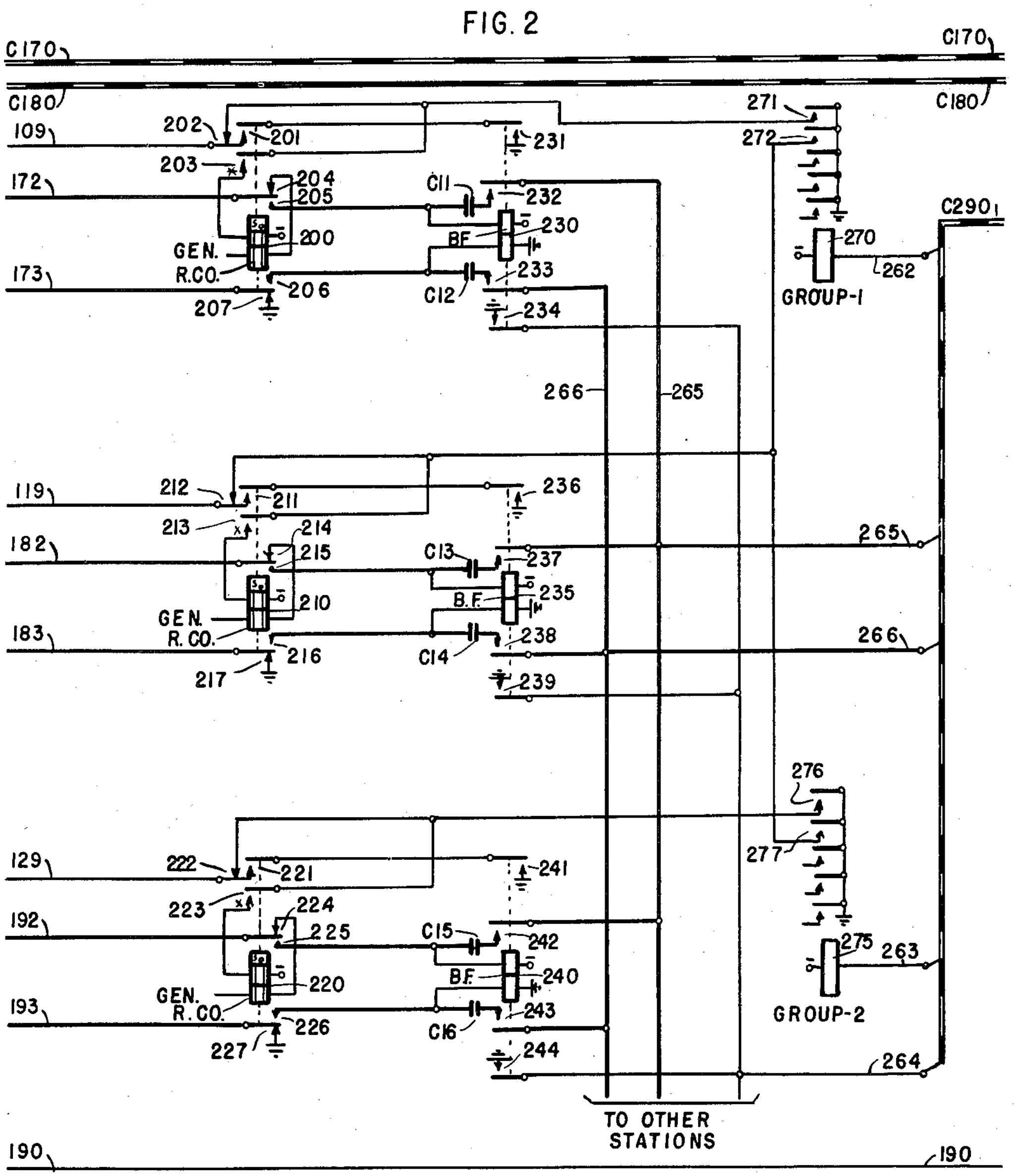
Fig. 2 is a circuit diagram of two group-conference gang relays and the conference relays individually associated with three of the subscribers' lines shown in Fig. 1.

Reference now is made to Figs. 7 and 8 in which there is shown a special service unit that enables the subscribers entitled to these services to set up either a code call, namely with the aid of the code call sender, Fig. 9, or set up a conference call to a desired one of a number of fixed conference groups, these last mentioned groups being determined by the contact wiring of gang relays such as 270 and 275, Fig. 2. To reach this special service unit the calling subscriber should dial 1 as the first digit. If tens switch TS, Fig. 5, of an idle finder-connector link has been set on its first position in response to the dialing of this digit code call relay 350, Fig. 3, will be operated over the B wiper of this switch and the connector caused to test the busy condition of control conductor 583 of which one end is connected to the first bank contact in the C bank of tens switch TS while its other end is connected to the special service unit Figs. 6, 7 and 8. No impulsing circuit, either automatic or numerical is closed or prepared for the stepping magnet of units switch US in this instance, that is this last mentioned switch is not moved out of its normal position on code or conference calls.

The special service unit has a line finder CF, Fig. 7, associated therewith and when the special service unit is seized over conductor 583 this line finder is caused to search for the calling subscriber's line. It will be noted from Fig. 7 that the special line finder CF which may be of the same type as the regular line finders LF, also has a fourth or EC wiper and contact row, the arrangement being such that the EC contacts of the special line finder are strapped to corresponding bank contacts of the regular line finders only for those lines that are entitled to initiate code and conference calls; on all other line this EC connection between the special line finder bank and the regular line finder multiple is omitted. Assuming that the calling subscriber is entitled to code and conference calls, test relay 730 of the special line finder will operate in a circuit extending over the EC wiper and bank contact of the special finder, the aforementioned EC strapping, the EC bank contact and wiper of the regular line finder and release relay 360, Fig. 3. Consequently the wipers of this finder CF are arrested, the calling number of the special service unit is guarded and the calling bridge relay 770 of this unit switched through directly to the calling subscriber's line by way of the wiper and contacts of the special line finder to the exclusion of the finder-connector link, this last mentioned link being released and thereby rendered available to other calls.

After the calling line has been switched through to the special service unit, dial tone which was previously returned from the finder-connector link after the regular line finder had originally found the calling line and was then disconnected upon the calling party dialing the first digit, is now again returned from the special service unit as an indication to the calling party that he may proceed with the dialing of the further digits required for the completion of code or conference calls. Should a calling party not entitled to code and conference call services attempt to gain access to the special service unit by dialling 1, the special line finder due to the absence of the above mentioned EC strapping will continue its hunting movement and since the calling subscriber thus fails to receive dial tone after dialing the first digit 1 he will abandon his call upon noticing his mistake. It may be noted that since the circuit means for granting the code and conference call privileges are different from those for providing the executive right-of-way privileges referred to above a subscriber may be given the one or the other or both privileges as desired.

It will now be assumed that a subscriber upon making a regular call to a wanted party has received no answer due to this last mentioned party being absent from his telephone. For this purpose the calling subscriber assuming that he is entitled to code and conference call services will replace his receiver and upon again lifting his instrument from the hookswitch dial 1 to establish connection with the special service unit as just described. Upon receiving dial tone from this unit the calling party will then dial two digits into the special service apparatus which correspond to the special code assigned to the desired party. It will be noted from an inspection of Figs. 8 and 9 that the special service unit contains two register switches, S1 and S2, these two switches being 11-position rotary stepping switches with three wipers and contact rows each, and on code calls these switches are set in accordance with the last mentioned two digits respectively. The code call sender comprises a finder switch S3 which is assumed to be a 26-position rotary stepping switch having 3 wipers and contact rows. As shown in Figs. 8 and 9 certain contacts in the B and C banks of sender switch S3 of the code call sender are connected to the first five contacts in the A banks of selector switches S1 and S2 by way of two groups of five marking conductors respectively, whereby $5 \times 5 = 25$ two-digit codes may be provided for. In this manner any twenty-five of the maximum number of eighty parties corresponding to the ultimate capacity of the switchboard assumed herein may be assigned a special two-digit code, each of these two digits being either a 1, 2, 3, 4 or 5. Upon positioning of selector switches S1 and S2 in response to these two digits code call switch S3 is automatically conditioned to actuate a number of code call sounders such as 983 and 984 which are strategically distributed throughout the establishment to sound the code determined by the setting of selector switches S1 and S2. Each of these codes then consists of two series of signal elements, the first series comprising a number of signal elements corresponding to the first of the aforementioned two digits and the second series comprising a number of signal elements corresponding to the second of these digits with a separating interval between the two series. The transmission of this code is automatically repeated by the code call sender until the called party responds to the code call as will now be described.

Upon hearing his characteristic code the called party in order to enter into communication with the calling party will dial the code call answering number 0 from the nearest telephone. As will be seen from Figs. 5 and 7 there is provided a code call answering trunk comprising conductors 581, 582 and 584. This trunk is connected at its one end to position 10 of the tens switch TS of all line finder connector links and is terminated at its other end in the special service unit.

When this code call answering trunk is seized responsive to the tens switch of an idle link being set on its 10th position upon the called party dialing 0, a loop is placed across the talking conductors of the answering trunk in the special service unit so that the ring is cut off and the call switched through in the connector and the code call sender stopped after the completion of the code just being sent. In this way a talking connection is established extending from the party that originated the code call, by way of special line finder CF and condensers C7 and C8, Fig. 7, connector and line finder of the link used in dialling the answering number, to the telephone from which the called party answered the call. It will be noted that units switch US of the connector employed in answering the code call is not required in setting up the answering connection; this switch accordingly remains in its normal position.

Referring again to Figure 9, relays 940, 950 and 960 have been provided to condition the code call sender for the transmission of a code alarm under the control of some alarm actuating means, such as non-locking key 982, which may be mounted in a suitable location, for instance near a watchman's or fireman's desk. When this key is operated the code call sender is conditioned to actuate the code sounders in uniformly spaced intervals, once for every step of sender switch S3, to notify the personnel of the establishment in question of the existence of an alarm condition such as a fire. The regular calling trunk to the special service apparatus is rendered busy during the transmission of a special code alarm.

Should a code call be in process of transmission at the time the special code alarm key is actuated, the code call sender will complete the particular code cycle already begun but will then transmit the special alarm signal in preference over the code call signal. The sounding of the alarm signal is discontinued after sender switch S3 has completed one revolution, and if the party who originated the regular code call has not abandoned the call in the meantime and this last-mentioned call is still unanswered the transmission of the regular code will automatically be resumed by the code call sender.

Referring now to Figure 1 there is shown associated with the lines of subscribers A, B and C each a cut-through relay, the three relays in question being indicated by reference characters 100, 110 and 120, respectively. Each of these relays functions when a conference call is being set up to a fixed group of stations, such as B, to switch the line of the station with which the relay is associated, from the regular line equipment, that is line and cut-off relay 140 in the example assumed, to the associated conference relays, 210 and 235 in the present example, shown in Fig. 2. As may be seen from the last mentioned figure a set of two of these conference relays is provided for each of subscribers A, B and C, one of the two relays of each set functioning as a ring cut-off relay and the other as a battery feed relay on conference calls to the associated station.

As will be clear from Figures 1 and 2 each of the cut-through relays is controlled by a make contact of at least one of the conference group gang relays 270, 275 which are selectively operable over conductors 262, 263 connected to contacts 6 and 7, repectively, in the A bank of selector switch S1, Fig. 8, of the special service unit. As illustrated in the drawings, the arrangement is such that if the first fixed conference group is selected and gang relay 270 accordingly operated, cut-through relays 100 and 110, respectively associated with stations A and B are operated to make contacts 271 and 272, respectively of the last mentioned gang relay; and that if the second fixed group is selected and therefore gang relay 275 operated, cut-through relays 110 and 120, respectively associated with substations B and C are operated from make contacts 277 and 276, respectively of this latter gang relay. It will thus be seen that the subscriber at station A is a member of conference group No. 1, the subscriber at station C a member of conference group No. 2 and the subscriber at station B a member of both groups 1 and 2. It should also be noted that while only two conference groups have been shown equipped in Figures 1 and 2 a total of five groups could be provided in the instant embodiment in which case the windings of the five corresponding gang relays would be respectively connected to positions 6, 7, 8, 9 and 10 in the A bank of selector switch S1 as indicated in Fig. 8.

It will further be noted from Figure 1 that while subscribers A, B and C thus are all members of a conference group, the other three subscribers A', B' and C' which are connected to the same line and cut-off relays 130, 140 and 150, respectively, are not members of a conference group and cannot therefore receive conference calls. This is due to the fact that each cut-through relay such as 110 when operated functions to switch only one station of the associated party line, in the instant case station B, from the line and cut-off relay, 140, and the automatic switchboard to the conference relays, 210 and 235, Figure 2, whereas the other station, B', on the party line remains connected to the line and cut-off relay and to the switchboard. However, inasmuch as code and conference call privileges are granted in the instant embodiment on a line rather than party basis, namely by virtue of the strappings 189, 393 and 390 between the EC bank of special line finder CF, Fig. 7, and the EC bank of regular line finders LF, Fig. 3, all six subscribers A, A'; B, B'; C, C' are enabled to initiated conference calls. This arrangement is especially advantageous where one of the parties such as B on a party line is an executive and the other, B', his secretary because it makes it possible for the secretary to set up a conference for the executive although she herself is not a member of the conference group. The specific arrangement shown in Fig. 1 also enables the secretary, say B', to initiate regular telephone calls while the executive, B, is engaged in a conference into which he has been called either by his secretary or by some other privileged subscriber.

As will be understood from the foregoing explanation, the privileges of the substations illustrated in Fig. 1 thus are as follows: Subscribers D and D' are party line subscribers without any special privileges. Subscribers A, B and C, and A', B' and C' are privileged to initiate code and conference calls. Subscribers A, B and C are furthermore equipped to receive conference calls, namely subscriber A in group 1, subscriber C in group 2 and subscriber B in groups 1 and 2. Subscriber A, in addition is privileged to cut in on busy lines. As pointed out above any subscriber is enabled to answer a code call.

In order to briefly explain the functioning of the apparatus described herein in the handling of conference calls let it be assumed that the secretary at substation B' wishes to set up a conference between the members of conference group 2. this group including the executives at substations B and C. To this end the secretary upon lifting her receiver will first dial "1" to connect herself with the special service apparatus exactly as explained above for a code call. Accordingly, after the special line finder has found the calling line the calling party is connected via line finder CF to calling bridge relay 770 of the special service unit while the link used in setting up the connection to this unit is released. Upon receiving dial tone from the special service unit the calling subscriber then proceeds to dial "7." In response to the receipt of this digit selector switch S1 is set on its 7th contact to which the winding of gang relay 275, Fig. 2, is connected. The circuit to this gang relay is closed in the special service unit without the receipt of a 3rd digit, selector switch S2 remaining in its normal position in the case of a conference call.

Operation of gang relay 275 causes the operation of the cut-through relays such as 110 and 120, Fig. 1, of the subscribers that are members of conference group No. 2. Each of these cut-through relays in operating transfers the associated station from the regular switchboard equipment to talking conductors such as 182, 183 or 192, 193 and guards the control lead such as 186, 196 from connector banks, whereby the party line in question is busied to regular incoming calls. Ringing current is now transmitted through the lower winding of relay 210 to station B and through the lower winding of relay 220 to station C. When the subscriber, say at station B, lifts his receiver relays 210 and 235 operate in succession to cut off the ring and switch the subscriber by way of condensers C13, C14 through to conference talking conductors 265, 266, talking battery to subscriber B being supplied from relay 235. When subscriber C lifts his receiver in answer to the call, relays 220 and 240 operate and function in a similar manner.

It will be noted from Figs. 2, 8 and 7 that the conference talking conductors 265 and 266 are switched through to the talking wipers of special line finder CF by way of make contacts of relay 860 which is operated on conference calls, among others to busy the code call answering trunk, and also by way of make contacts of release delay relay 810 which is controlled by calling bridge relay 770 of the special service unit. In this manner the calling party, in this instance the secretary at station B′, can converse with the members of the selected conference group as each lifts his telephone, in spite of the fact that the secretary does not belong to this group. At the end of the conference the aforementioned relay 860, Fig. 8, remains operated under the joint control of calling bridge relay 770 and all the battery feed relays such as 235, 240 of the conference group called. This insures that both the calling and code call answering trunks terminating in the special service unit remain guarded until all the members of the conference group and also the conference originating party have replaced their receivers.

Should a member of the conference group to be called, for instance the executive at station B, originate a conference call himself the operation is similar to the one just described except that in this case the calling party is disconnected from the switchboard as soon as his cut-through relay such as 110 operates. As a consequence the calling party is connected to the conference talking path directly by way of the make contacts 114, 115 in the assumed example, of the cut-through relay while calling bridge relay 770 and associated release delay relay 810 in the special service unit restore to normal. However, relay 860 remains operated under the control of the battery feed relays, Fig. 2, and thereby holds the special service unit guarded as before until all the members of the conference group have retired from the conference.

It was described above how the transmission of a regular code call is discontinued or suspended on actuation of special code alarm key 982, Fig. 9. While, therefore, the special code alarm is arranged to override a code call it does not override a conference call but the special service apparatus is designed so that a special code alarm may be initiated and transmitted while a conference is being held. In this case the calling trunk to the special service apparatus will not be unguarded until both the special code alarm and the conference have been terminated.

*Call from substation D to substation C′*

Having described the operation of the telephone system illustrated in the drawings in general terms, a more detailed description of this embodiment of the invention will now be given.

Let it be assumed first that the subscriber at substation D, Fig. 1, wishes to make a regular call to the subscriber at substation C′. When the subscriber at station D lifts his receiver the following loop circuit is closed for line and cut-off relay 160; ground, contact 163, subscriber's loop, contact 161, upper and lower windings of relay 160 in series, battery. The upper winding of relay 160 which, as previously mentioned, is of the 2-step type is a resistance winding and the relay is so designed that when the lower winding of relay 160 is energized with the resistance of its upper winding in series the armature of the relay is attracted only sufficiently to cause its preliminary or "x" contacts 162 and 165 to be closed. Thus partially operated, relay 160 at its contact 162 prepares the line finder test circuit and at its contact 165 closes ground to the distributor start conductor 190.

As the distributor, Fig. 6, is of the preselecting type, wipers 605 and 606 of distributor switch DS will normally rest on contacts associated with an idle finder-connector link in which case ground is absent from guard conductor 667 and wiper 605. Under this assumption the following circuit is closed for distributor start relay 610 in series with magnet 675 of the distributor switch: ground, contacts 164, 165, Fig. 1, distributor start conductor 190, contact 602, Fig. 6, winding of relay 610, contacts 601 and 676, stepping magnet 675, battery. Magnet 675 cannot operate in series with the winding of relay 610 but as the magnet winding is of low resistance compared with that of relay 610 this last-mentioned relay operates. Relay 610 upon operating, at its contact 611 opens a point in an alternative circuit of stepping magnet 675; at contact 612 opens a point in a "kick-off" circuit to magnet 675; at contact 613 the relay closes an obvious circuit to the lower winding of relay 620; at contact 614 relay 610 closes a multiple ground to the winding of all-links-busy relay 600; at contact 615 it prepares a line finder test circuit extending through the upper winding of relay 650; and at contact 616 it closes a pre-energizing circuit through the lower winding of the last-mentioned relay, this lower winding, however, not being strong enough to cause relay 650 to operate at this time. The aforementioned preenergization of relay 650 causes this relay to operate quickly upon the line finder test wiper encountering battery potential so that when the line finder happens to stand on the calling line, unnecessary starting of the line finder is avoided.

Upon energization of its lower winding relay 620 operates with a certain delay which is due to the short circuit of its upper winding at contact 634. After relay 620 has operated it closes at its contact 621 an obvious circuit to the winding of slow-to-operate relay 630 and at its contact 622 prepares a circuit for timing relay 660. When relay 630 operates a short time after energization of its winding, it closes the following circuit for start relay 320 of the pre-selected link, Figures 3–5: ground, contact 631, wiper 606 and bank contact of distributor switch DS, conductor 647, start relay 320, Fig. 3, battery. At contacts 632 and 633, relay 630 closes a point in two incomplete circuits for distributor switch magnet 675, respectively; at contact 634 the relay opens the short circuit across the upper winding of relay 620 to render this last-mentioned relay fast to operate; at contact 635, relay 630 closes another multiple ground to the winding of all-links-busy relay 600; and at contact 636, the relay closes a point in the circuit of line finder magnet 370.

When line finder start relay 320 operates, it closes the following circuit for calling bridge relay 330; ground, lower winding of relay 330, contact 321, resistance 387, upper winding of relay 330, battery. Relay 330 upon operating, at its contact 322 also prepares a circuit to the winding of line finder switching relay 310; at contact 323 closes another point in the aforementioned line finder test circuit; and at contact 324 completes the following circuit for line finder magnet 370: ground, contacts 636, 641, 652, Figure 6, conductor 617, contacts 324 and 315, Fig. 3, line finder stepping magnet 370, battery.

Calling bridge relay 330, upon operating in the aforementioned circuit, at its contact 33 closes an obvious circuit to the winding of release delay relay 340 which accordingly operates; and at contact 332 opens a point in the connector impulsing circuit. Relay 340 in operating at its contact 341 closes a point in the last-mentioned impulsing circuit and at contact 342 causes the operation of relay 410, Fig. 4, by way of conductor 391. Relay 410 in thus operating at its contact 411 closes ground through contact 491 to permanent alarm conductor 445; at contact 412 closes a point in the dial tone circuit; at contact 413 grounds the start conductor 439 for starting a common ringing generator and interrupter, tone and timer apparatus which is not shown in the drawings; at contact 414 relay 410 closes operating or holding ground to various incomplete circuits; at contact 415 it prepares a holding circuit for line and cut-off relay 160; at contact 416 it opens a point in the tens switch homing circuit; at contact 417 it closes a point in the circuit for slow-release relay 460; at contact 418 it opens a point in an alarm circuit extending over conductor 429; and at contact 419 it prepares a circuit for relay 520.

Reverting now to line finder LF, Figure 3, the stepping magnet 370 of this finder upon its energization closes its contact 371 thereby completing a circuit extending over conductor 607 to interrupter relay 640, Figure 6. The latter relay upon operating at its contact 641 opens the above-traced operating circuit for line finder magnet 370 to cause this magnet to release and thereby cause the line finder to advance its wipers one step. Also upon the release of line finder magnet 370 the circuit of interrupter relay 640, Fig. 6, is opened at contact 371 so that relay 640 restores, reclosing at its contact 641 the operating circuit of line finder magnet 370. As a result, this magnet is again energized and contact 371 recloses the circuit of interrupter relay 640. This relay upon operating again opens the circuit of line finder magnet 370, thereby causing this magnet to re-open contact 371 and cause the wipers of line finder LF to be advanced another step. The foregoing interaction between magnet 370 and interrupter relay 640 continues until the wipers of the line finder have been positioned on the set of bank contacts associated with the calling line. When these contacts have been reached test relay 650, Fig. 6, and line and cut-off relay 160, Fig. 1, which are both pre-energized as above described, operate in series in the following circuit: ground, contact 615, upper winding of relay 650, conductor 627, contact 323, Fig. 3, C wiper 383 and bank contact of finder switch LF, conductor 156 of cable C170, contact 162, Fig. 1, lower winding of relay 160, battery.

Relay 650 upon operating at its contact 652 opens a point in the above-traced circuit of line finder magnet 370 to prevent the re-operation of this magnet; at its contact 651 the relay closes the following circuit for line finder switching relay 310: ground, contacts 636, 641, 651, Fig. 6, conductor 637, contact 322, Fig. 3, winding of switching relay 310, battery; at contact 654, relay 650 opens a point in the holding circuit for timer relay 670, and at contact 653 it actuates total call meter 685 over an obvious circuit. When switching relay 310, Fig. 3, operates, it switches the calling line through to calling bridge relay 330, namely by way of talking conductors 136, 146 of cable C170, bank contacts and talking wipers 381, 382, of line finder LF, and contacts 311 and 312; this establishes a holding circuit for calling bridge relay 330 independent of contact 321 of start relay 320 and causes dial tone to be connected to the calling line by way of condenser C2, conductor 389, contacts 412, 492, Fig. 4, condensor C5 and dial tone conductor 446. At contact 313, relay 310 closes a substitute circuit for line and cut-off relay 160 extending from ground at contact 415, Fig. 4, by way of conductor 390, contact 313, and the C wiper 383 and C bank contact of line finder LF, Fig. 3; at contact 314, relay 310 completes a holding circuit for itself, this last-mentioned circuit extending from ground at contact 415, Fig. 4, by way of conductor 390, contacts 361 and 314, Fig. 3, and the winding of relay 310 to battery; at 315, relay 310 opens another point in the circuit of line finder magnet 370; at contact 317 the relay opens a point in the circuit extending over all-trunks-busy conductor 337; and at contact 316, it closes ground to link guard conductor 667.

The last-mentioned ground on link guard conductor 667 extends over the bank contact and wiper 605 of distributor switch DS and contacts 632, 676 and 601 to the upper terminal of the winding of distributor start relay 610 whereby this relay is caused to release. Ground on link guard conductor 667 also causes distributor switch magnet 675 to be energized over a part of the circuit path just traced. Relay 610 in restoring at its contact 611 closes an alternative short circuit of this relay which is independent of contact 676 of the distributor switch magnet; at contact 612 the relay closes an alternative circuit for the last-mentioned magnet, this circuit extending from ground through contacts 612 and 633 and magnet 675 to battery; at contact 613 the relay opens the circuit of relay 620; at 614 removes a multiple ground from the winding of all-trunks-busy relay 600; at 615 opens the line finder test circuit extending through the upper winding of test relay 650; and at 616 opens the circuit of the pre-energizing winding of this relay. Test relay 650 in restoring at contact 652 closes a point in the circuit of line finder magnet 370 but this circuit can no longer be completed as it is open at contact 324 of switching relay 320. Relay 620 in restoring at contact 622 disconnects timer relay 660 from time pulse conductor T1 and at contact 621 opens the circuit of relay 630 so that this relay also restores.

When relay 630 releases, ground is removed at contact 631 from start conductor 647 so that line finder start relay 320 restores. At contacts 632 and 633 the two aforementioned circuits to distributor switch magnet 675 are opened so that this magnet in restoring closes its interrupter contact 676 to again prepare the operating circuit of start relay 610 and advances the wipers of distributor switch DS to the next set of contacts; at contact 634 a short circuit across the upper winding of relay 620 is reestablished in preparation for the next call; at contact 635 a multiple ground is removed from all-trunks-busy relay 600; and at 636 another point in the circuits for line finder switching relay 310 and line finder magnet 370 is opened. Prior to the circuit operations last described, line and cut-off relay 160, Fig. 1, was fully operated in the aforementioned line finder test circuit, whereby contacts 161, 163, respectively disconnected battery and ground from the calling line in the line equipment and contact 164 disconnected ground from conductor 190 and the lower terminal of the winding of distributor start relay 610 provided no other line was in calling condition at this time.

Reverting to the step taken by distributor switch DS upon release of relay 630 as just described it will be understood that switch DS will take no further steps provided no ground potential is encountered by its wiper 605 upon completion of this step, i. e. provided the finder-connector link connected to the corresponding second set of bank contacts of distributor switch DS is idle at this time. On the other hand should this link be busy, ground on the guard conductor of this link will cause distributor switch magnet 675 to be re-energized over a circuit extending from ground on this conductor; wiper 605, contacts 611, 601, 676 and magnet 675 to battery. Magnet 675 upon operating at its interrupter contact 676 opens the last-mentioned circuit so that magnet 675 restores thereby advancing its wipers to the next following set of bank contacts. In this manner the wipers of distributor switch DS are automatically advanced until an idle link having no ground on its guard conductor is found. Should the link connected to the last position of the distributor switch be found busy, switch DS is advanced to its home position, but since in this last-mentioned position off-normal springs 691 are closed, ground at the off-normal springs will immediately cause the switch to be advanced to its first position in which it is shown in the drawing.

If all links become busy at time other than while the distributor, Fig. 6, is in start condition, ground is removed from common all-trunks-busy conductor 657 and the normally operated all-links-busy relay 600 restores. As a result a point in the automatic stepping circuit for magnet 675 is opened at contact 601 so that unnecessary stepping of distributor switch DS is avoided; at contact 602 start conductor 190 is disconnected from the lower terminal of the winding of distributor start relay 610 to prevent the seizure of the distributor in a call that may originate during the all-trunks-busy condition; and at contact 603 an obvious circuit is closed to all-trunks-busy meter 680 whereby the all-trunks-busy condition is registered.

Reference has been made above to a "kick-off" circuit extending over contacts 612 of relay 610 and make contact 633 of relay 630 to distributor switch magnet 675. This circuit is used to advance the wipers of the distributor switch to the next position if a call is abandoned before the line finder, for example because of a faulty condition, has found a calling line, that is before switching relay 310 could operate to energize magnet 675 by way of guard conductor 667. This prevents the same line finder from being used on successive calls under the last-mentioned condition.

Should the line finder upon the initiation of a call fail to find the calling line due to some faulty condition and the calling party fail to abandon the call within a predetermined time, the same result would be brought about by means of a ground pulse received from the common timer, not shown, by way of pulse conductor P2 and contact 661 of relay 660. More specifically, if relay 620 is still operated by the time a ground pulse is received over pulse conductor P1, relay 660 will operate in a circuit extending from ground on this conductor, contacts 664 and 622 and the winding of relay 660 to battery. Relay 660 in operating at its contact 661 closes pulse conductor P2 to the winding of distributor switch magnet 675; at its contact 662 closes the winding of relay 670 to pulse conductor P3 by way of contact 672; and at contacts 663, 664 transfers the winding of relay 660 from ground on pulse conductor P1 to ground on start conductor 190. When ground after a certain time interval is next closed to pulse conductor P2 in the timer, this ground will cause the energization of distributor switch magnet 675 by way of contact 661; and at the end of this ground pulse the magnet will be deenergized again whereby the wipers of the distributor switch are advanced one step.

Should the calling condition on start conductor 190 persist and relay 660 still be operated when ground, after another time interval, is connected to pulse conductor P3, this last-mentioned ground will cause the operation of relay 670 by way of contacts 662 and 672. Relay 670 upon operating at its contact 673 closes an obvious circuit to alarm lamp 691 and at contacts 671, 672 transfers the winding of relay 670 from ground on pulse conductor P3 to ground on contact 654 of test relay 650. This alarm condition will be removed when the line finder finds the calling line so that test relay 650 in operating opens the holding ground of relay 670 at contact 654, permitting the latter relay to release. If the call is thus completed the holding circuit of relay 660 also is opened at contact 622 when relays 610 and 620 restore as a result of the operation of finder switching relay 310. It will be seen that because of the slow-operating characteristic of relay 620 in view of the short circuit across its upper winding sufficient time is allowed for relay 660 to restore even though a new call that might be waiting at this time should cause relays 610, 620 and 630 to go through another operating cycle.

Reverting again to the operation of the finder-connector link, it will be recalled that relays 310, 330, 340 and 410 are in operated condition subsequent to line finder LF finding the calling line. On hearing the dial tone, the calling party, D, will now proceed dialling the first or tens digit "7" of the called party's number. Calling bridge relay 330 accordingly responds to the impulses received over the calling line by restoring and re-operating seven times in quick succession. Each time relay 330 restores it closes, at its contact 332, the impulsing circuit traced below, and at contact 331 opens the circuit of relay 340. Due to its slow releasing characteristic this last-mentioned relay stays operated throughout the impulse series. Upon the first release of calling bridge on line relay 330 the following circuit is closed to relay 460: ground, contacts 332 and 341, Fig. 3, conductor 394, contacts 425, 488, 417, Fig. 4, winding of relay 460, battery. Relay 460 in operating at its contact 462 opens a point in the circuit of relay 490 and at its contact 461 causes the operation of relay 450 over an obvious circuit. The last-mentioned relay at its contacts 451, 453 transfers the C wiper 565 of tens switch TS from the lower winding of relay 480 to the winding of busy relay 420; and at contact 454 closes a locking circuit to its winding independent of contact 425 of the busy relay. Also at contact 332 the following impulsing circuit to stepping magnet 540 of tens switch TS is closed: ground, contacts 332 and 341, Fig. 3, conductor 394, contact 425 or 454, 488 and 495, Fig. 4, conductor 467, magnet 540, Fig. 5, battery. Motor magnet 540 is energized over this current. When line relay 330 upon reoperating at the end of the first impulse opens its contact 332, magnet 540 is deenergized whereby the wipers of tens switch TS are advanced from the home position to position 1 of this switch. In this manner the wipers of the tens switch are advanced one step for every restoration of line relay 330. Relay 460 and consequently relay 450 stay operated during the series of impulses because of the slow-releasing properties of relay 460.

At the end of the impulse series the wipers of tens switch TS rest on position 7 of the switch and relay 460 releases as the circuit is permanently opened at contact 332 of relay 330, this latter relay remaining in operated condition at the end of the first digit. Relay 460 upon restoring at its contact 462 closes the following circuit for relay 490: ground, bank contact and A wiper 561 of tens switch TS in position 7, conductor 448, contact 462, Fig. 4, winding of relay 490, battery. When relay 490 operates it opens at its contact 491 the permanent alarm circuit extending over conductor 445; at contact 492, relay 490 disconnects dial tone from the calling line; at contact 494, relay 490 closes a locking circuit for its winding independent of contact 462 of relay 460; at 495, relay 490 opens another point in the above-traced impulsing circuit; at 496 the relay closes a multiple guarding ground extending over conductor 495 to guard conductor 667, Fig. 3; at contact 497 the relay opens another point in the all-trunks-busy circuit; at 498 it prepares an alarm circuit extending over alarm conductor 429 for the purpose of supervising the release of tens switch TS at the end of the call; and at contact 493 the relay completes the following circuit to relay 520: ground, contacts 414 and 493, Fig. 4, conductor 466, B wiper 562 and 7th bank contact of tens switch TS, Fig. 5, home bank contact and wiper 577 of units switch US, conductor 458, contact 419, Fig. 4, conductor 457, relay 520, Fig. 5, battery.

As will be seen from the strapping of the B bank of tens switch TS, relay 520 which serves to position units switch US on its 11th position as described hereafter is caused to operate only when tens switch TS has been arrested in any of positions 6, 7, 8 or 9 of the switch. Relay 520 in operating at its contact 521 opens a point in the test circuit extending over C wiper 565 of the tens switch; at its contact 522 the relay closes the following circuit for relay 510: ground, contacts 414 and 493, Fig. 4, conductor 466, contact 522, Fig. 5, winding of relay 510, battery; at contact 523 the relay opens a point in the impulsing circuit for units switch US; at contact 525, the relay opens a point in the homing circuit of the units switch; and at contact 524 the relay extends ground at the left hand terminal of its winding by way of interrupter contact 551 to the winding of stepping magnet 550 of units switch US to energize this magnet. When relay 510 operates as mentioned above it closes a locking circuit for itself at its contact 511; at contact 512 it opens another point in the homing circuit of the units switch; at contact 513 it opens a point in the homing circuit for tens switch TS; and at contact 514 it closes a point in the impulsing circuit for the units switch.

When magnet 550 of units switch US is energized due to the aforementioned closure of contact 524 it opens its own circuit at its interrupter contact 551. When the magnet is thus deenergized it advances the wipers of the units switch from its normal or home position to position 1 and re-closes its interrupter contact 551. In position 1 of the units switch the off-normal springs 578 of this switch are actuated so that off-normal relay 530 is caused to operate over an obvious circuit. This relay in operating at its contact 531 closes a point in the units switch homing circuit; at 532 it closes a multiple ground extending over conductor 395 to link guard conductor 667; and at contact 533 closes a multiple ground to conductor 456, this ground serving to supervise the release of units switch US at the end of the call. When stepping magnet 550 recloses its interrupter contact 551 as mentioned above this magnet is again energized so that the magnet in re-operating again interrupts its own circuit by renewed actuation of interrupter contact 551. The magnet is thereby deenergized again, interrupter contact 551 recloses and the wipers of the switch are accordingly advanced to position 2.

This automatic stepping action of units switch US continues until the switch reaches position 11 at which time wiper 577 disengages itself from the bank contacts of the units switch that are strapped to contacts 6–9 in the B bank of the tens switch as shown in Fig. 5. As a result the above automatic stepping circuit of magnet 550 can no longer be re-closed and the circuit of relay 520, which likewise extends over the C3 wiper and bank of units switch US, also is opened so that this relay releases. Relay 520 upon releasing at its contact 521 re-closes a point in the testing circuit extending over wiper 565 of the tens switch; and at its contact 524 opens another point in the last-mentioned automatic stepping circuit for units switch 550.

The circuit is now in condition to receive the second or tens digit dialled by the calling subscriber. In response to this digit which is assumed to be a 5, line relay 330 will release and re-operate five times in quick succession. Again relay 340 remains operated during the brief interruptions of its circuit at contact 331. On the first closure of contact 332 upon receipt of the first impulse of this series the aforementioned circuit for relay 460 again is closed and this relay in operating at its contact 461 again causes the operation of its slave relay 450, whereby C wiper 165 is again transferred from the lower winding of connector switching relay 480 to the winding of busy relay 420. Because of the slow release characteristic of relay 460, relays 460 and 450 again remain operated for the duration of the impulse series. Closure of contact 332 also completes the following impulse circuit to stepping magnet 550 of units switch US: ground, contacts 332, 341, Fig. 3, conductor 394, contacts 425 or 454, 488, conductor 469, contacts 514 and 523, Fig. 5, magnet 550, battery. When calling bridge relay 330 re-operates at the end of the first impulse the last traced impulse circuit to magnet 550 is opened so that this magnet in releasing advances the wipers of the units switch from start position 11 to position 12. In this fashion the wipers of the units switch are advanced one step for each release and re-operation of relay 330 so that at the end of the impulse series, when relay 330 remains in operated condition, the wipers of the units switch come to rest on position 16 of this switch.

With tens switch TS positioned on its position 7 and units switch US set on its position 5 it will be noted that the talking wipers 563 and 564 of the tens switch are respectively connected by way of conductors 591 and 592 to the upper talking wipers 571 and 572 of the units switch, and that these last-mentioned wipers in turn connect with talking conductors 191 and 194 which lead to the party line shown as the third from the top in Fig. 1. It will also be noted that a line reversal has been introduced in the connection between the talking wipers of the tens switch and those of the units switch, that is the negative talking wiper 571 of the units switch is connected to the positive talking wiper 564 of the tens switch and the positive talking wiper 572 of the units switch is connected to the negative talking wiper 563 of the tens switch. This insures that ringing current is projected over the positive side of the called line as will be explained hereinafter. Moreover, it will be understood that the C wiper 565 of the tens switch is connected by way of conductor 895 and the C1 wiper 575 of units switch US with conductor 196 which extends to the lower winding of line and cut-off relay 150, Fig. 1, associated with the called party line.

Assuming first that this called line is idle, battery potential through the lower winding of line and cut-off relay 150 will be encountered by the C1 wiper of units switch US. Accordingly when relays 460 and 450 release successively at the end of the second impulse series the following circuit is closed for the lower winding of connector switching relay 480 and line and cut-off relay 150 in series: ground, contacts 414, 435 and 422, Fig. 4, lower winding of relay 480, contacts 485 and 451, conductor 465, contact 521, Fig. 5, wiper 565 and 7th bank contact in the C bank of the tens switch, conductor 895, wiper 575 and the 16th contact in the C1 bank of the units switch, conductor 196, contact 128, Fig. 1, lower winding of relay 150, battery. Both relays 480, Fig. 4, and 150, Fig. 1, operate in this circuit. Line and cut-off relay 150 in fully operating at its contacts 151, 152 disconnects battery and ground from the line in the line circuit. During the armature travel of relay 150 there will be a short time interval during which preliminary contact 155 is already closed while contact 154 is not open as yet. During this short interval ground will be applied to the distributor start conductor 190 so that start relay 610, Fig. 6, may operate momentarily. However as relay 620, due to the short circuiting of its upper winding, and also relay 630 are slow in operating such a momentary operation of relay 610 will not cause a line finder to be started under this condition.

When switching relay 480 operates in the connector as just described it closes a locking circuit for itself at its preliminary contact 484, this circuit extending from ground through contacts 414 and 484 and the upper winding of relay 480 to battery. At its contact 481 relay 480 connects ring-back tone to the negative side of the calling line over the following circuit path: battery-connected ringing generator, not shown, conductor 459, lower winding of relay 470, ring-back tone condenser C3, contacts 431, 481 and 472 and from there through condenser C1 to the calling party's telephone. At contacts 482 and 483 of relay 480 the following ringing circuit is closed for the ringer at substation C′, Fig. 1: battery-connected generator, not shown, conductor 459, lower winding of relay 470, contacts 471 and 482, conductor 447, wiper 563 and associated 7th bank contact of the tens switch, Fig. 5, conductor 592, positive talking wiper 572 and associated 16th bank contact of units switch US, conductor 194, positive side of the line of subscriber C′ and from there through the condenser and ringer at station C′ to ground. Relay 480, furthermore, at its contact 486 closes direct ground to C wiper 565 to guard the called line against intrusion; at its contact 485 disconnects its lower winding from the test circuit extending over the last-mentioned C wiper; at contact 487 opens a point in the homing circuit for tens switch TS; at contact 488 opens a point in the impulsing circuit for units switch magnet 550 and at contact 489 opens a point in the homing circuit of this last-mentioned switch.

Upon hearing the ringing signal the subscriber at substation C′ answers the call by lifting his receiver from the switchhook. As a result ring cut-off relay 470 which could not operate in response to the ringing current alone will now operate because of the closure of the direct current loop over the called subscriber's line. This loop extends from the aforementioned battery-connected generator through most of the circuit path just traced, the closed hookswitch contacts at substation C′, conductor 191, bank contact and wiper 571 of the units switch, conductor 591, bank contact and wiper 564 of the tens switch, conductor 449 and contacts 483 and 474 to ground. Upon its energization over the last-mentioned direct current loop relay 470 closes its preliminary contact 476, whereby the upper winding of relay 470 is energized in a circuit extending from ground through contacts 486 and 476 and the upper winding of relay 470 to battery. Thus energized over its upper winding relay 470 operates fully thereby opening the ringing circuit at its contacts 471, 474 and switching the called line through to battery feed impedance 465 at contacts 473, 475. At contact 472, ring-back tone is disconnected from the calling side of the connection. The calling party at substation D and the called party at substation C′ may now converse with each other by way of condensers C1 and C2, the calling party's transmitter being supplied with direct current through the windings of relay 330 and the called party's transmitter through the windings of impedance 465.

Release of the connection is under the sole control of the calling party. Thus, if at the end of the call the party replaces his receiver, relay 330 restores causing slow release relay also to release. Relay 340 in restoring in turn causes the release of its slave relay 410. When relay 410 restores, the opening of contact 415 interrupts the holding circuit of line finder switching relay 310 which releases thereby removing a multiple ground from link guard conductor 667, and also interrupts the circuit of the line and cut-off relay, 160, of the calling party so that this relay likewise restores to normal. Also upon the release of relay 410 ground is disconnected at contact 414 from the holding circuits of relays 510, 480 and 470, whereby these relays are caused to release. With relays 510, 480 and 410 restored the following circuit is closed for the stepping magnet of tens switch TS: ground, A bank and wiper of switch TS, conductor 448, contacts 487 and 416, Fig. 4, conductor 468, contacts 513 and 541, Fig. 5, winding of magnet 540, battery. Magnet 540 attracts its armature thereby opening its energizing circuit at interrupter contact 541. As a result magnet 540 advances its wipers into position 8 and re-closes its interrupter contact 541. In this manner the tens switch is stepped ahead until it reaches its home position. In this position the A wiper of the switch disengages the A bank, all the contacts of which are connected to ground, so that stepping magnet 540 cannot be energized again. As a further consequence of wiper A returning to its normal position the circuit of relay 490 is opened so that this relay restores, thereby removing a multiple ground from link guard conductor 667 and from alarm conductor 429.

With relays 510 and 480 restores, a similar homing circuit is closed for stepping magnet 550 of units switch US, this circuit extending from ground through units switch off-normal contact 578, contacts 531 and 512, conductor 427, contact 489, Fig. 4, conductor 428, contacts 525 and 551, Fig. 5, magnet 550 to battery. Magnet 550 in operating opens this homing circuit at interrupter contact 551 so that the magnet becomes deenergized and the wipers of the units switch are advanced from position 16 to position 17. In this fashion the switch steps ahead until it reaches its home position. In this home position of switch US off-normal springs 578 open and consequently the last-mentioned stepping circuit is broken so that magnet 550 cannot be re-energized. Also upon the opening of off-normal contact 578, relay 530 releases, thereby removing ground from link guard conductor 667 and from alarm conductor 429.

It will be understood from the foregoing description of the homing operation of switches TS and US, that these two switches are homed independently of each other and that their homing action is supervised by alarm conductor 429; for should one or the other of the two switches fail to restore to normal, relay 490 or 530, as the case may be, would be held operated and the alarm circuit kept closed over contact 498 or 433. Assuming that delayed alarm equipment is connected to the other end of conductor 429, this alarm will become effective if one or the other switch has not reached its home position within a predetermined time. It may be mentioned at this point that similar delayed alarm equipment may also be connected to the far end of permanent alarm conductor 495. When this permanent alarm becomes effective after a certain time it serves as an indication that the calling party has failed to dial within a given time after seizure of the link.

In the above description it was assumed that the line of called line C′ was found idle by the connector when called. Let it be assumed now that the called party's line is busy in either an incoming or outgoing call at the time the wipers of units switch US are set on this line. In this case the control conductor 196 associated with this party line carries ground potential and as a consequence the following circuit to busy relay 420 is closed prior to the release of relay 450 at the end of the units digit: ground on control conductor 196, contact 16 in the C1-bank of units switch US, wiper 575 of this switch, conductor 595, seventh C-contact and wiper 565 of tens switch TS, contact 521, conductor 465, contact 453, Fig. 4, winding of busy relay 420, battery. Busy relay 420 in operating at its contact 421 connects busy tone to the calling side of the connection over the following circuit path: busy conductor 499, condenser C6, contacts 421, 433, conductor 389 and from there over talking condenser C2, Fig. 3, to the telephone instrument of the calling party; at contacts 422, 423 the relay transfers ground from the lower winding of switching relay 480 to its own winding, thereby closing for itself the following holding circuit which becomes effective upon the release of relay 450: ground, contacts 414, 435, 423, 437, 442, 452, winding of relay 420, battery. At contact 424 the busy relay opens a point in the circuit of relay 360; and at contact 425 relay 420 opens a point in the numerical impulsing circuit.

Upon receiving the busy signal the calling party will replace his receiver and thereby cause the successive release of relays 330, 340, and 410 as described above in connection with the release of a completed connection. At contact 415 relay 410 opens the circuits of relays 310 and 160 and at contact 414 relay 410 opens the locking circuits of relays 420 and 510 so that all these relays restore to normal. With relay 510 released the above traced homing circuits for stepping magnet 540 of tens switch TS and magnet 550 of units switch US also are closed. From thereon the release of the finder-connector link proceeds in the manner described above for a completed call.

The foregoing description will make it clear how the link circuit shown in Figs. 3–5 functions when the calling party releases after the completion of a call or upon receiving a busy signal. Should the calling party abandon the call prior to dialling, line relay 330, Fig. 3, in releasing at its contact 332, closes the impulsing circuit to magnet 540 of the tens switch and slow release relay 460 in parallel. Relay 460 in operating in turn causes the operation of its slave relay 450. Subsequently relay 340 restores thereby opening the circuits of magnet 540 and relay 460 at its contact 341 and opening the circuit of relay 410 at contact 342. Relay 410 in restoring at its contact 415 causes the release of relays 310 and 160 as described above and at its contact 417 also opens the circuit of relay 460 so that the latter relay releases after a certain delay, in turn causing relay 450 to restore. Relay 410 upon releasing at its contact 416 furthermore closes the above-traced homing circuit for magnet 540 which extends over the A wiper of the tens switch TS. As soon as relay 460 restores the operating circuit for relay 490 also is closed namely at contact 462. Relay 490 at contact 496 maintains ground on guard conductor 667 and at contact 498 closes the alarm circuit extending over conductor 429 to supervise the homing of the tens switch.

If the special service apparatus is busy while the tens switch upon the calling party restoring his receiver goes through the aforegoing stepping cycle, ground encountered by wiper 565 in position 1 of this switch will operate busy relay 420 but this will cause no harm as the calling party has hung up and as with contact 414 open no locking circuit can be closed for relay 420. Should the wiper 565 encounter ground at the control lead of the code call answering trunk when the switch is in position 10 the closure of a circuit through the winding of relay 520 and the lower winding of relay 480 in series is avoided by the provision of contact 419 which is open at this time. As soon as the tens switch reaches its home position, magnet 540 cannot be energized anymore and the circuit of relay 490 also is opened so that this relay releases. The link circuit shown in Figs. 3–5 is thereby returned to its normal condition.

*Call from substation A to substation B*

It will be recalled that substation A is provided with facilities for cutting in on a busy line. For this purpose a push button or non-locking key 178 is provided at this station and one spring of the make contact of this key or button is connected by way of conductor 189 to the corresponding contact in the EC bank of line finder LF, Fig. 3. The other contact spring of push button 178 is shown in Fig. 1 directly connected to ground but if desired this connection may be taken through a hookswitch contact of station A so that ground cannot be connected to conductor 189 except when the handset at this station is off the hook.

When the subscriber at station A lifts his receiver to place a regular call to substation B, finder LF of an idle link is caused to search for and connect with a calling line in the manner described above in connection with a call from substation D. It will be seen from Fig. 1 that substation B which is assumed to be the called subscriber in the present case, has directory number 42 so that the calling party upon receiving dial tone will dial 4 as the first digit. In response to this digit the tens switch TS, Fig. 5, is positioned on its fourth set of contacts as described in the preceding section. However, since at the end of this impulse series B wiper 562 of tens switch TS is arrested on its fourth rather than seventh bank contact the above-traced circuit for relay 520 cannot be closed in the instant case. When relay 490 operates upon the release of relay 460 at the end of the first digit the following alternative circuit is closed for relay 510: ground, contacts 414 and 493, Fig. 4, conductor 466, B wiper 562 of switch TS, Fig. 5, contact 4 of the B bank of this switch, winding of relay 510, battery. Relay 510 in operating at contact 511 closes a locking circuit for itself and at contact 514 closes a point in the impulsing circuit for units switch US.

A circuit is now ready for the receipt of the second series of impulses in response to which stepping magnet 550 of the units switch receives two numerical impulses over the impulsing circuit traced in the preceding section, this circuit extending from ground through contacts 332 and 341, Fig. 3, conductor 394, contacts 425 and 488, Fig. 4, conductor 469, contacts 514 and 523, Fig. 5, and the winding of magnet 550 to battery. Since the second or units digit is assumed to be 2 units switch US will be advanced in response to this digit from its home position to position 2.

It will be noted that with tens switch TS thus set on its fourth position and units switch US on its position 2, the lower set of wipers 573 and 574 of the units switch is connected up through wipers 563 and 564 of the tens switch so that connection is made through the wipers of tens and units switch in series and conductors 181, 184 with the party line including substation B and B', Fig. 1. Attention also is called to the fact that in the instant case the talking wipers of the units switch are connected to those of the tens switch without line reversal, that is negative talking wiper 573 is connected with negative talking wiper 563 and positive talking wiper 574 with positive talking wiper 564. Accordingly if the called line is idle and connector switching relay 480 operates in series with the line and cut-off relay of the called line as described in the preceding section, ringing current will be projected over the negative side of the called line namely in the following circuit: battery-connected generator, not shown, conductor 459, lower winding of relay 470, contacts 471 and 482, Fig. 4, conductor 447, wiper 563 and associated 4th bank contact of tens switch TS, Fig. 5, conductor 593, wiper 573 and associated second bank contact of units switch US, conductor 181, contact 113, Fig. 1, condenser and ringer at called subscriber station B, ground.

The operation of the link circuit upon the answering of the call by the called party and subsequently upon disconnection of the calling party is substantially the same as described in the preceding section in connection with a call from substation D to substation C' and therefore need not be described again at this point.

It will now be assumed that the party line to which the called subscriber B is connected is busy. Accordingly, after the units switch has been positioned on this line, busy relay 420 will operate and lock as explained in the preceding section so that the executive at calling substation A receives busy tone. The executive at this station now may either replace his receiver as described in the preceding section or he may cut in on the busy line by depressing his push button 178. When this push button is depressed the following circuit for relay 440 is closed: ground, make contact of pushbutton 178, Fig. 1, conductor 189, corresponding EC-bank contact and EC wiper 384 of line finder LF, Fig. 3, conductor 329, contact 419, Fig. 4, conductor 328, contact 351, Fig. 3, conductor 393, winding of relay 440, Fig. 4, battery. relay 440 in operating at its contact 441 closes ground by way of conductor 387 to IL conductor 325, Fig. 3; and at its contact 442 opens the short circuit across the winding of relay 430 so that this last-mentioned relay, upon release of relay 450 at the end of the units digit, operates in series with the winding of busy relay 420 in the following holding circuit for the latter relay:

ground, contacts 414, 435 and 423, winding of relay 430, contact 452, winding of busy relay 420, battery.

Upon operating in this circuit relay 430 at contact 437 opens another point in the aforementioned short circuit across its winding; at contact 431 opens a point in the ring-back tone circuit; at contacts 432 and 434 switches the calling party through to the called line by way of condensers C4 and C5; and at contacts 436, 435 substitutes the following circuit for the last-traced circuit including relays 430 and 420 in series: busy ground on control conductor 186, Fig. 5, C2-bank contact and wiper 576 of the units switch, conductor 596, 4th C-bank contact and wiper 565 of the tens switch, contact 521, conductor 465, contacts 436 and 423, Fig. 4, winding of relay 430, contact 452, winding of busy relay 420, battery.

When the party at substation A subsequently releases push button 178, ground is removed from conductor 189, Fig. 1, and relay 440, Fig. 4, releases, thereby disconnecting ground from conductor 325 at contact 441. Due to contact 437 being open reclosure of contact 442 upon the release of relay 440 will not affect the operated condition of relay 430.

The executive at substation A may now converse, by way of condenser C4 and C5, with the called party at substation B while the other party with which subscriber B is connected in either an outgoing or incoming call is still on the line. On the other hand, the executive upon notifying these two parties of his desire to talk to subscriber B may hang on while the two parties mentioned finish their conversation. Subsequently when both parties in this original call have replaced their receivers ground potential is disconnected from control conductor 186 and accordingly the last-traced series circuit through the windings of relays 430 and 420 is broken. Both these relays will accordingly restore to normal and as a result the following circuit including connector switching relay 480 and line and cut-off relay 140 of the called line in series is now completed: ground, contacts 414, 435 and 422, Fig. 4, lower winding of relay 480, contacts 485 and 451, conductor 465, contact 521, Fig. 5, wiper 565 and associated fourth bank contact, conductor 596, wiper 576 and associated second bank contact, conductor 186, contact 118, Fig. 1, lower winding of relay 140, battery. Both relays 480 and 140 operate in this circuit and accordingly the bell at called substation B is now rung exactly as if this subscriber's line had been idle in the first place as described above. The circuit functions upon answering and release of the connection also correspond to those described in the preceding section.

*Code call from substation A to substation B*

As mentioned above those subscribers that are entitled to initiate code calls or conference calls, have their corresponding EC bank contacts in the banks of special line finder CF, Fig. 7, and regular line finders LF, Fig. 3, connected with each other. In the case of the line of subscribers A and A', the conductor providing this connection is designated in these figures by reference numeral 189.

Assuming that the subscriber at station A in calling subscriber B, as described above, has obtained no answer from this last-mentioned subscriber and that this latter party is one of the subscribers to whom a code is assigned for code call purposes subscriber A, upon replacing his handset, may proceed to establish a code call to called subscriber B. In order to set up this code call the party at substation A removes his handset again from the cradle and is thereby connected with an idle finder-connector link in the manner described hereinbefore. Subscriber A then dials "1" as the first digit, this being the digit used for giving calling access to the special service apparatus. Dialling of the digit "1" causes line relay 340, Fig. 3, to restore and reoperate once whereby the wipers of tens switch 1 are advanced to position 1 by way of the above traced impulsing circuit for the tens switch. When relay 460 releases and relay 490 operates at the end of this impulse series, special service relay 350 operates in the following circuit: ground, contacts 414 and 493, Fig. 4, conductor 466, B wiper 562 and first B contact of tens switch TS, Fig. 5, conductor 397, winding of relay 350, Fig. 3, battery. Relay 350 in operating at its contacts 351, 352, transfers the EC wiper of line finder LF from the winding of busy cut-in relay 440 to the winding of special release relay 360. It should be noted that with the B wiper of tens switch TS in its first position neither relay 510 nor relay 520 operates so that neither the automatic nor the digital impulsing circuit is closed or prepared for units switch magnet 550.

Assuming that the special service unit is idle, battery is connected to test conductor 583 which is a part of cable C590 and upon release of relay 450 at the end of the digit the following circuit is closed for relays 480 and 740 in series: ground, contacts 414, 435 and 422, Fig. 4, lower winding of relay 480, contacts 485 and 451, conductor 465, contact 521, Fig. 5, C wiper 565 and first contact in the C bank of tens switch TS, conductor 583, contact 841, Fig. 8, conductor 737, contact 761, Fig. 7, winding of relay 740, battery. In operating, relay 480 at its preliminary contact 484 closes a locking circuit extending from ground at contact 414 to the upper winding of relay 480; at contacts 482 and 483, the relay closes ringing generator and ground to wipers 563 and 564 of the tens switch, respectively, but at the present instance the ringing circuit cannot be completed due to the fact that contacts 1 in the line banks of the tens switch are unconnected; and at 481 the relay closes ring-back-tone to the calling line. This tone is immediately disconnected again when the finder-connector link releases as described below; in fact transmission of ring-back-tone to the calling party could be avoided in the present case if desired by taking the right-back-tone circuit through a break contact not shown on special service relay 350. At contact 486, relay 480 closes direct ground to C wiper 565 to insure the operation of relay 740 and busy the special service calling number.

When relay 740 operates it closes at its contact 741, a pre-energizing circuit for finder test relay 730 and a circuit for relay 720 in parallel. The first of these circuits extends from ground through contacts 751 and 741, resistance 785 and the upper winding of relay 730 to battery but relay 730 cannot operate when thus energized over its upper winding with resistance 785 in series. The second of the aforementioned circuits may be traced from ground through contacts 751, 741, 731, 781 and the winding of relay 720 to battery. At its contact 742, relay 740 also closes a point in the testing circuit for relay 730, this circuit extending over the above mentioned EC conductor 189. Relay 720 in operating at its contact 721 causes the energization of finder magnet 780 so that this magnet in operating opens its interrupter contact 781, thereby opening the circuit of relay 720. Upon the release of this last mentioned relay the circuit of magnet 780 is interrupted at contact 721 and upon the release of magnet 780 special finder CF advances its wipers from the position on which it happens to rest to the next following position.

The aforementioned interaction between relay 720 and magnet 780 repeats itself until finder CF has found the calling line. At this time the following test circuit is closed for relays 730 and 360 in series: ground, winding of relay 360, Fig. 3, conductor 398, contact 424, conductor 392, contact 352, Fig. 3, conductor 328, contact 419A, Fig. 4, conductor 329, EC wiper 384 and the first EC bank contact of line finder LF, condutor 189, first contact in the EC bank of finder CF, Fig. 7, EC wiper 728 of this last-mentioned switch, lower winding of relay 730, contacts 742 and 752, resistance 784, battery.

Test relay 730 upon operating in this circuit at its contact 731 opens a point in the above-traced circuit for relay 720 so that this relay cannot operate again; at contact 732, relay 730 short circuits resistance 785, thereby insuring the holding of relay 730 over its upper winding alone; at contact 733 the relay closes a circuit extending over contact 753 to the winding of relay 760 to energize this winding; and at contact 734 relay 730 closes a multiple holding ground to line and cut-off relay 130 through C-wiper 727 of finder CF, this last mentioned wiper being connected to the lower winding of relay 130 by way of the first contact in the C bank of the switch, conductor 175 and contact 133, Fig. 1.

Relay 760 in operating after a certain time delay due to the short circuit across its lower winding, at contact 761 opens the energizing circuit of relay 740 thereby causing this relay to release after a certain time delay; at 762, relay 760 closes ground to control conductor 583 to guard the special service unit against seizure in another call; at 763 the relay opens a short circuit across its lower winding to render itself fast-to-release; at 769, relay 760 opens a point in the circuit of relay 750; at 716 its opens a point in an alarm circuit extending over alarm conductor 819; at 767, relay 760 grounds motor start conductor 786 to keep the power equipment including the tone generator in operation; at contacts 765 and 766, the relay switches the talking wipers 725 and 726, of special finder CF through to condensers C7 and C8 and also to the upper and lower windings respectively of line relay 776, and at 764, it connects dial tone to the calling party over a circuit path extending from dial tone conductor 868, condenser C9, contacts 865 and 838, conductor 796, contacts 764 and 766, Fig. 7, wiper 726 and from there over the positive side of the subscriber's line to substation A. The battery feed circuit for this substation extends from battery and ground over the upper and lower windings respectively of relay 770, contacts 765 and 766, wipers 725 and 726, the first contacts in the two line banks of special finder CF, conductors 171 and 174, contacts 103 and 106, Fig. 1, substation A.

When line relay 770, Fig. 7, operates in the circuit traced above it opens a point in the impulsing circuit for selector switches S1 and S2, Fig. 8, at its contact 771 and at its contact 772 causes the energization of the winding of relay 810 over an obvious circuit. Relay 810 upon operating at contact 812, closes a point in the aforementioned impulsing circuits; at 813 causes the operation of relay 820 over an obvious circuit and at contacts 815, 816 closes a point in the negative and positive side, respectively, of a conference talking circuit which circuit, however, is not used in the present type of call. At contact 814, relay 810 closes a multiple ground to C wiper 727 of special finder CF. Relay 820 upon operating at its contacts 821 and 825 opens a point in the homing circuits of selector switches S1 and S2, respectively; at 822 prepares a circuit to slow-to-release relay 850; at 823 closes ground at contact 715 to the C-wiper of switches S1 and S2; and at 824 closes a holding ground to the upper winding of relay 760.

When relay 740 releases after a slight delay upon its circuit being opened at 761 it opens at its contact 741 the circuit for the upper winding of relay 730 and at contact 742 the test circuit extending through the lower winding of relay 730 and the winding of special release relay 360 in the finder-connector link. Relay 730 in restoring at contact 734 removes a multiple ground from C-wiper 727 and at 733 opens the operating circuit of relay 760 but this last-mentioned relay is held from ground at contact 824. Relay 360, Fig. 3, also restores but prior to its release it brings about the release of the finder-connector link in the following manner: At contact 361 of relay 360 the holding circuit of relay 310 is opened and this relay in restoring at its contacts 311 and 312 disconnects the calling subscriber's line from the windings of calling bridge relay 330. At its contact 331, relay 330 in restoring causes the release of relay 340 and this relay upon restoring at its contact 342 in turn brings about the release of relay 410. Relay 410 upon releasing at 414 opens the circuit of relay 350 and the holding circuit of relay 480. With relays 410 and 480 released the homing circuit for tens switch TS is closed at contacts 416 and 487, respectively. When this last-mentioned switch has reached its home position, relay 490 releases due to its circuit being opened at the A wiper of switch TS. The link circuit has now returned to its normal condition while line and cut-off relay 130 of the calling party is held over the C wiper of special finder CF as explained above.

Assuming that the code assigned to called party B for code call purposes is 2–3 subscriber A upon receiving dial tone from the special service unit as just described, will dial a "2" as the second digit. When relay 770 restores in response to the first impulse of this series, the following circuit is closed to magnet 870 of selector switch S1: ground, contact 771, Fig. 7, conductor 790, contact 812, Fig. 8, conductor 789, contact 713, Fig. 7, conductor 788, contacts 833 and 845, Fig. 8, winding of magnet 870, battery. Magnet 870 upon operating in this circuit at its contact 871 opens a point in its homing circuit but this is of no effect at the present time. Also a contact 771, relay 770 causes the operation of relay 850 in the following circuit: ground, contact 771, Fig. 7, conductor 790, contact 812, Fig. 8, conductor 789, contact 713, Fig. 7, conductor 788, contacts 822 and 847, Fig. 8, winding of relay 850, battery. Relay 850 which, because of its slow release characteristic stays operated during the impulse series, disconnects ground from C-wipers 853 and 856. Relay 810 likewise is slow to release and, therefore, remains operated throughout the series of impulses in spite of the momentary interruptions of its circuit at contact 772 of relay 770. When contact 771 opens, upon the first re-operation of relay 770, magnet 870 is deenergized and upon releasing re-closes its interrupter contact 871 and also advances the wipers of switch S1 to the first position of the switch. Similarly when line relay 770 restores and then re-operates in response to the second impulse of this series the wipers of selector switch S1 are advanced from position 1 to position 2.

At the end of the series relay 850 restores with a slight delay, due to its circuit being held opened at contact 771, and in releasing closes the following circuit for relay 840: ground, contact 715, Fig. 7, conductor 792, contacts 823 and 851, Fig. 8, C wiper 853 of selector switch S1, second C bank contact of this switch, contact 835, winding of relay 830, battery. Relay 830 upon operating in this circuit at its contact 831 opens another point in the homing circuit of selector switch S1; at 832 closes a point in the starting and operating circuit for the code call sender Fig. 9; at 833, 834 the relay transfers the impulsing circuit from magnet 870 of selector switch S1 to magnet 880 of selector switch S2; at contacts 835, 836 the relay transfers its own winding from its above-traced operating circuit to a holding circuit extending from ground at contact 715, Fig. 7, through conductor 792, and contacts 823, 836, Fig. 8; at 837, the relay connects ground by way of conductor 886 to the eighth contact in the B bank of code call sender switch S3, Fig. 9; at 838 the relay opens the dial tone circuit; and at 839 it closes a point in the aforementioned alarm circuit extending over conductor 819.

Calling subscriber A next dials 3 as the 3rd digit, according to the second portion of the called party's code. Again line relay 770 restores in response to each impulse of this series, relay 810 remaining operated throughout the digit. Upon each release of relay 770 the following circuit is closed for magnet 880 of selector switch S2: ground, contact 771, conductor 790, contact 812, Fig. 8, conductor 789, contact 713, Fig. 7, conductor 788, contacts 834 and 846, Fig. 8, winding of magnet 880, battery. In parallel thereto the above-traced circuit of slow-release relay 850 also is closed so that this relay operates and remains in operated condition throughout the digit. Magnet 880 upon its energization in the foregoing circuit opens its interrupter contact 881 without effect at this time, while relay 850 at its contact 851 disconnects ground from the C wipers of switches S1 and S2. Upon the first re-operation of relay 770, the winding of magnet 880 is deenergized so that the wipers of selector switch S2 are advanced from its home position to its position 1.

When relay 850 releases at the end of this last digit, with the wipers of selector switch S3 in position 3, a circuit is closed for relay 840 which may be traced as follows: ground, contact 715, Fig. 7, conductor 792, contacts 823, and 851, Fig. 8, wiper 856 and third C bank contact of switch S2, contact 848, winding of relay 840, battery. In operating, relay 840 at 841 opens a point in control conductor 583 and at 842 closes a substitute ground to this conductor; at 843 the relay completes the following circuit for relay 930 in the code call sender: ground, contact 962, Fig. 9, conductor 884, contacts 832 and 843, Fig. 8, conductor 883, contacts 972, and 913, Fig. 9, winding of relay 930, battery; at contact 844, relay 840 closes ground to wiper 855 of selector switch S1 and wiper 858 of selector switch S2; at contacts 845 and 846, the relay opens a point in the impulsing circuits for magnets 870 and 880, respectively; at contact 847, relay 840 opens another point in the circuit of relay 850; at contacts 848, 849, transfers its own winding from its last-traced operating circuit to a holding circuit which extends from ground at contact 715 via conductor 792 and contacts 823, 849; at contact 849, the relay closes a point in the aforementioned alarm circuit; and at 849 it opens a point in the homing circuit for selector switch S2.

It will be seen from Figs. 8 and 9 that the first five contacts in the A bank of selector switch S1 are connected with the first five contacts in the B bank of sender switch S3 in reverse order by way of marking conductors 891 to 895; and that the first five contacts in the A bank of selector switch S2 are connected with contacts 9 to 13 in the C bank of sender switch S3 in straight order by way of marking conductors 896 to 890. In the instant case closure of contact 844 of relay 840 connects ground by way of a wiper 855 and the second A bank contact of switch S1 via conductor 894 to the 5th contact in the B bank of switch S3 and by way of A wiper 858 of switch S2 and the 3rd A bank contact of this switch and conductor 898 to the 11th contact in the C bank of sender switch S3. This conditions the code call sender to transmit a code consisting of a first series of two signal elements and then after a pause, a further series of three signal elements as will now be described.

When the winding of relay 930, Fig. 9, is energized in the above-traced circuit, the relay at its contact 931 causes the energization of sender switch magnet 970 over a circuit extending from operating ground on conductor 883 through contact 931 to the winding of magnet 970 to battery. The latter magnet in operating at its contact 972 opens the circuit of relay 930 and at its contact 971 closes a point in the signalling circuit to code sounders 983, 984, this last mentioned circuit however, still being open at contact 914. Relay 930 releases a short time after its circuit is opened at 972 and at its contact 931 causes the deenergization of sender switch magnet 970. This magnet in restoring at its contact 972 re-closes the circuit to relay 930 and advances its wipers from its home position to position 1 in which off-normal contacts 985 and 985*a* are actuated. This interaction between relay 930 and magnet 970 repeats itself until the switch reaches its position 5 at which time the following circuit is closed for relay 910: ground, contact 844, wiper 855, second contact in the A bank of switch S1, marking conductor 894, 5th contact in the B bank of switch S3, B wiper 992 of switch S3, lower winding of relay 910, upper resistance winding of relay 910, battery. Relay 910 upon operating at its contact 911, locks to operating ground on conductor 883 independently of wiper 992; at contacts 913, 912 transfers operating ground through contact 972 from the winding of relay 930 to the winding of relay 920; and at contact 914 prepares the signalling circuit extending over conductor 988. Relay 920 upon operating at contact 922 closes dial tone to the calling party over a circuit path extending from dial tone conductor 868, Fig. 8, condenser C9, conductor 888, contact 922, Fig. 9, conductor 887, conductor 796, contacts 764 and 766, Fig. 6, and the positive line wiper of finder CF; and at its contact 921 closes operating ground on conductor 883 to the winding of relay 930. When this last-mentioned relay operates it in turn closes the operating ground to the winding of sender switch magnet 970. This magnet upon operating at its contact 972 opens the circuit of relay 920 and at its contact 971 closes a signalling circuit extending from operating ground on conductor 883 by way of contacts 971, 914 and conductor 988 to the code sounders such as 983, 984. When relay 920 releases upon its circuit being broken at 972 it causes the disconnection of dial tone and the release of relay 930 and this last-mentioned relay upon restoring in turn causes the deenergization of magnet 970 so that the first signal element is terminated by the opening of contact 971 and relay 920 re-operated by the closure of contact 972.

It will be appreciated from the foregoing description that by the introduction of relay 920 into the interrupter cycle by virtue of the operation of relay 910 the sender switch is now stepped at a reduced speed and that for each of these slow steps the signalling circuit extending over conductor 988 is closed once, namely for the time during which magnet 970 is energized, and a splash of dial tone is transmitted to the calling party once, namely during the interval in which relay 920 is operated.

After switch S3 has completed two of these steps and two signal elements have accordingly been sounded by the code sounders, the wipers of switch S3 reach position 7 in which the lower winding of relay 910 is short circuited over a circuit path extending from the left-hand terminal of the lower winding of this relay, wiper 992, 7th B bank contact of switch S3, contact 952, right-hand terminal of the lower winding of relay 910. Relay 910 in releasing because of this short circuit, opens its locking circuit at 911 and the signalling circuit at 914; and at contacts 912, 913 transfers operating ground from the winding of relay 920 back to the winding of relay 930, thereby causing the sender switch to resume its stepping at its original fast rate. These fast steps of sender switch S3 serve to introduce a pause or silent interval between the first and second series of signal elements. When sender switch S3 reaches its position 8, relay 910 is again operated, namely over the following circuit: contact 837, Fig. 8, conductor 886, 8th contact in the B bank of sender switch S3, B wiper 992 of this switch, lower winding of relay 910, upper resistance winding of relay 910, battery. Accordingly, the above mentioned locking circuit is again closed for relay 910, and the interrupter cycle for magnet 970 switched from high to low speed and the signalling circuit made effective so that one signal element and one splash of dial tone are again transmitted for each step of the switch. After three steps at this reduced speed, that is after the transmission of three further signal elements, the switch reaches its position 11 and in this position the lower winding of relay 910 is again short circuited, in this case due to the connection of ground to the right-hand terminal of its lower winding over the following circuit path: ground, contact 844, Fig. 8, wiper 858, 3rd contact in the A bank of switch S2, conductor 898, 11th contact in the C bank of switch S3, wiper 993, contact 952, right-hand terminal of the lower winding of relay 910. As a result of this short circuit, relay 910 again releases thereby again disabling the signalling circuit and switching the interrupter cycle of switch S3 from low to high speed. In this manner the switch continues its stepping cycle at its original high rate of speed, thereby to introduce a relatively long silent interval between successive complete codes. It will be noted when the switch reaches position 14 another short circuit is closed across the lower winding of relay 910, this short circuit extending over the B-wiper and the 14th B bank contact of switch S3 and contact 952. If relay 910 is already released as it is in normal circuit operation, this renewed short circuiting of the lower winding of relay 910 has no effect on the functioning of the circuit. On the other hand should relay 910 have failed to release in any of positions 9 to 13 of switch S3 for instance because of a temporary discontinuity in the above-traced short circuiting path extending over the C-wiper of switch S3, the relay will in this manner be forced back to its normal position when the switch reaches position 14 and while the second series of signal elements may have been spoiled due to the last-mentioned faulty condition this condition may have remedied itself when the switch goes through the next revolution and a proper code may then be transmitted.

When sender switch S3 subsequently reaches its position 5 at the beginning of its next revolution relay 910 again is operated by way of marking conductor 894 and wiper 892 and transmission of the code signal 2–3 is repeated in the manner described above. Sender switch S3 thus automatically continues its stepping operation, transmitting one complete code cycle for each revolution of its wipers.

When the called subscriber hears his characteristic code he will go to the nearest telephone and upon lifting the receiver from the cradle dial the code call answering number which in the present embodiment is "0." As described above in connection with other types of calls, upon initiation of the call the finder of an idle link is caused to hunt for the calling line and when this line has been found, relays 310, 330, 340 and 410 operate in the link circuit used. In response to the called party dialing "0" line relay 330 restores ten times and tens switch TS, Fig. 5, is accordingly advanced to its tenth position. It will be noted from an inspection of Fig. 5 that the tenth contact in the B bank of switch TS is unconnected. Accordingly only relay 490 operates upon the release of relay 460 at the end of the digit dialled while relays 510, 520 and 350 remain unoperated. Therefore, when slave relay 450 of relay 460 also releases at the end of the digit the following circuit for connector switching relay 480 is operated provided the code call answering number is idle at this time: ground, contacts 414, 435 and 422, Fig. 4, lower winding of relay 480, contacts 485, 451, conductor 465, contact 521, Fig. 5, C wiper 565 and tenth contact in the C bank of tens switch TS, conductor 584 of the code call answering trunk, contact 711, Fig. 7, resistance 783, battery. Relay 480 in operating at its contact 484 locks through its upper winding to ground at contact 414; at contact 485 opens the circuit through its lower winding; at contact 486, closes direct ground to wiper 565 to guard the code call answering number and at contacts 482, 483 completes the following circuit through the lower winding of ring cut-off relay 470 and the upper winding of relay 710 in series, this last-mentioned winding being looped across the talking conductors 581, 582 of the code call answering trunk: battery connected generator, not shown, conductor 459, Fig. 4, lower winding of relay 470, contacts 471, 482, conductor 447, wiper 563 and the tenth contact in the negative line back of switch TS, Fig. 5, conductor 581, contact 714, Fig. 7, upper winding of relay 710, conductor 582, tenth contact in the positive line bank and wiper 564 of tens switch TS, Fig. 5, conductor 449, contacts 483 and 474, Fig. 4, ground.

Both relays 470 and 710 operate in this circuit. Relay 470 at its contact 476 locks to local ground and at its contacts 471, 473 and 474, 475 switches the line wipers of switch TS from generator and ground to talking condensers C1 and C2, Fig. 3, and in parallel thereto to the upper and lower windings of battery feed impedance 465, respectively. Relay 710 in operating at its preliminary contact 716 locks to ground at contact 824 by way of conductor 794 and its lower winding; and in fully operating at contact 714 opens the direct current loop extending through its upper winding; at 713 opens a point in the impulsing circuit of the special service unit; at 715 removes a multiple ground from the locking circuits of relays 830 and 840, these two relays now being held from ground at off-normal springs 985, Fig. 9, alone; and at contact 717 completes the following talking circuit between subscriber A and subscriber B: telephone instrument at substation A, contacts 103 and 105, Fig. 1, talking conductors 171 and 174, first contact in the two line banks of special finder CF, Fig. 7, wipers 725 and 726, contacts 765 and 766, condensers C7 and C8, contact 717 in the positive leg of this talking circuit, talking conductors 581 and 582, the tenth contact in the line banks of tens switch TS, Fig. 5, of the finder-connector link used in dialling the answering number, wipers 563 and 564 of this switch, conductors 447 and 449, contacts 482, 473 and 483, 475, conductors 388 and 389, condensers C1 and C3, Fig. 3, contacts 311 and 312, wipers 381 and 382 of finder LF and the contacts in the line banks of this finder which terminate the subscribers line over which the answering number was dialled, the talking conductors of this line to the telephone instrument at the corresponding substation.

Reverting now to the operation of the code call sender, the stepping of switch S3 and accordingly the transmission of the called party's code will continue subsequently to the operation of relay 710 until sender switch S3 reaches its home position at the end of the code cycle started. At the completion of this cycle off-normal springs 985 open and relays 830 and 840 accordingly restore, whereby operating ground for the code call sender is removed from conductor 883 at contacts 832 and 843 and marking ground disconnected from the A wipers of switches S1 and S2 at contact 844. Moreover at contact 831 a point is closed in the homing circuit for selector switch S1 and at 849B a point in the homing circuit for switch S2; and at contacts 839 and 849A a point in the alarm circuit extending over lamp 818 and conductor 819 is opened. At contacts 842 and 841, control conductor 583 of the special service calling number is transferred back to guarding ground at contact 762. Due to the aforementioned removal of operating ground from conductor 883, the code call sender is prevented from starting another code cycle.

Let it be assumed that at the end of the conversation the calling party A is the first to replace his receiver. Accordingly line relay 770, Fig. 7, in the special service unit releases, in turn causing the release of relays 810 and 820 which latter relay at its contact 824 opens the holding circuits of relays 760 and 710. Relay 760 in restoring transfers control conductor 583 of the special service calling number from guarding ground back to the winding of relay 740, and relay 710 in restoring switches control conductor 583 of the code call answering trunk from guarding ground to battery through resistance 783. It may also be mentioned at this point that relay 760 upon releasing at its contact 768 closes a point in the alarm circuit through alarm lamp 818 but this circuit is completed only if either relay 830 or 840 has failed to release, for instance due to sender switch S3 failing to restore to normal. Upon the release of relay 820 the following homing circuit is closed for selector switch S1: ground, B bank of switch S1, wiper 854, contacts 821, 831, and 871, winding of magnet 870, battery; and at contact 825 a similar homing circuit is completed for switch S2, this last-mentioned circuit extending from ground at the B bank of switch S2 through wiper 857, contacts 824, 849B, 881 and the winding of magnet 880 to battery.

When relay 710 in restoring closes its contact 714, it thereby places itself in a self-interrupting circuit which extends from battery and ground at battery feed impedance 465 of the connector, Fig. 4, to the upper winding of relay 710 by way of the last-mentioned break contact. The resulting self-interrupting action of relay 710 causes a buzzer tone to be transmitted to the telephone used by the called party B in answering the code call and this party will, therefore, replace his receiver. With the instrument at this telephone back on the cradle the finder-connector link employed in dialling the answering number releases substantially in the manner described in the preceding section. More specifically when the line relay 330, Fig. 3, restores upon opening of the loop circuit, it causes the release of relays 340, 410, 310, 480 and 470 in the link circuit and release of the line and cut-off relay in the line circuit. With relays 410, 480, released the homing circuit for tens switch TS is closed and when this switch has reached its normal position the circuit of relay 490 is opened at the A-wiper of switch TS, causing the release of the last-mentioned relay. The finder-connector link has thus returned to its normal condition.

Should the called party be the first to disconnect, the link circuit will be released first and the special service unit will then restore to normal as soon as the calling party at substation A also releases. Since relays 840, 760 and 710 thus do not release until disconnection by the calling party, both the special service calling number and the code call answering number remain guarded until the calling subscriber replaces his receiver. In this instance the above mentioned self interrupting circuit for relay 710 is not closed as talking conductors 581, 582 leading to the upper winding of this relay are open in tens switch TS which in the present instance has already restored to normal.

It has been assumed above that when the called party originally dialed the digit "1" to gain access to the special service unit, this last mentioned unit was tested idle by the connector used in setting up this connection. On the other hand should the special service unit be busy, ground connected to control conductor 583 by the contacts of either relay 760 or 840 will, prior to the release of relay 450 at the end of the digit, cause the operation of busy relay 420 of the connector in the following circuit: ground on control conductor 583, first contact in the C bank of tens switch TS, Fig. 5, C wiper 565 of this switch, contact 521, conductor 465, contact 453, Fig. 4, winding of relay 420, battery. Relay 420 locks to local ground and causes busy tone to be transmitted to the calling party as described above in connection with a regular call. Upon hearing the busy signal the calling subscriber at substation A will replace his receiver and the link circuit shown in Figs. 3–5 as well as line and cut-off relay 130 will thereupon restore to normal in the manner already explained.

It will briefly be considered now how the circuit functions in case a subscriber attempts to obtain access to the special service unit although he is not entitled to place code or conference calls. Assuming for instance that the subscriber at station D upon lifting his receiver dials the digit "1" which is the first digit for code or conference calls, an idle finder-connector link will be seized and its tens switch TS set on its first position as explained above for the case that the subscriber at station A was the calling party. As in that case, relays 480 in the connector and 740 in the special service unit operate in series and the latter relay causes the special finder CF, Fig. 7, to hunt for the calling line. However, as will be seen in Figs. 3 and 7, no strapping is provided in the present case between the EC bank contact of special finder CF and the EC bank contact of the regular line finders in the position 46, of these switches which correspond to the calling line serving subscribers A and A'. For this reason special finder CF will be unable to find the calling line as the testing circuit of this finder extending over the EC wiper and bank of the finder switches cannot be completed. The special finder will therefore continue its stepping action and since relay 760 cannot operate in this case the calling subscriber at station A fails to receive dial tone from the special service unit. The calling subscriber is likely to notice his error at this stage and when he replaces his receiver the finder-connector link, line cut-off relay 160 and relay 740 in the special service unit will return to normal in a manner which will be understod from the explanation given in the preceding sections. On the other hand should the subscriber attempt to dial further digits, the corresponding impulses will be without effect due to the impulsing circuit of the connector being open at contact 488 of relay 480.

It will now be assumed that at the time a privileged party for example at substation C, sets up a connection to the special service unit by dialling digit "1," a subscriber such as A having executive right-of-way privileges presses his pushbutton 178 in order to cut-in on a busy line with which he had made a connection over another finder-connector link. Although the probability for these two conditions to arise concurrently is only remote provisions have been made in the embodiment shown herein to prevent finder CF of the special service unit from being arrested by ground connected to the EC bank multiple directly at push button 178 of subscriber A rather than by ground connected through the winding of relay 360 and the EC wiper of the regular finder used in setting up the call to the special service unit. It will be recalled that when the executive at station A depressed his cut-in pushbutton relay 440 in the link used in establishing connection to the busy line, at its contact 441 connects ground to IL conductor 325. Ground on conductor 325 causes the operation by way of contact 769, of relay 750, Fig. 7, of the special service unit and this last mentioned relay therefore is and remains operated substantially when and as long as push button 178 at substation A is depressed. Relay 750 at its contact 751 opens a point in the circuit of the pre-energizing winding of relay 730 and of the winding of relay 720; at its contact 752 opens a point in the testing circuit of the special finder extending over the EC wiper of this switch; and at contact 755 opens a point in the operating circuit of relay 760. Therefore if the executive at substation A happens to actuate his push button 178 at the time when the special service unit is seized by the operation of relay 740 in response to the dialling of digit "1" into the finder-connector link, the special finder is kept from starting its hunting action while the cut-in push button is depressed; and even if this hunting action should already have begun and relay 730 have falsely operated from ground at that push button, relay 760 which due to the short circuit across its lower winding, is slightly slow to operate could not be energized upon closure of contacts 733 because the circuit of relay 760 is open at contacts 753. As soon as the busy cut-in push button 178 is released relays 440 in the link and 750 in the special service unit restore and relay 760 operates in response to the operation of relay 730 when the special finder has found the calling line.

*Special code alarm*

Relays 940, 950 and 960 in connection with key 982 serve to condition the code call sender for the transmission of a special code alarm signal which in the instant case consists in the repeated sounding of the code sounder 983, 984, etc. in uniformly spaced intervals. While in the present embodiment a non-locking key 982, has been shown, any other device adapted momentarily to connect ground to code alarm starting conductor 981 would serve the purpose.

In order to set the code call sender in motion for the transmission of a code alarm a fireman or other attendant momentarily actuates key 982 thereby causing relay 940 to operate by way of conductor 981. Contact 941 of relay 940 which is connected in parallel to contact 832 of relay 830 prepares the code call sender operating circuit extending over conductor 883 in spite of the fact that relay 830 is not operated on code alarms; at contact 942, relay 940, connects ground to wiper 991 of sender switch S3 to prepare the operation of relay 950; at contact 943, relay 940 locks to ground at contact 971; at 944 the relay prepares a locking circuit for relay 950; and at contact 945, relay 940 causes the operation of relay 840, Fig. 8, by way of conductor 889. Relay 840 upon operating at contact 841 opens and at 842 applies ground to control conductor 583 to guard the special service calling number; at contacts 845 and 846 the relay opens a point in the impulsing circuits to stepping magnets 870 and 880 of selector switches S1 and S2, respectively; at 847 it opens a point in the operating circuit of relay 850; at contact 849 prepares a locking circuit for itself extending from off-normal contact 985 by way of conductor 885; and at contact 843, the relay completes the following circuit for interrupter relay 930 of the code call sender: ground, contacts 962 and 941, Fig. 9, conductor 828, contact 843, Fig. 8, conductor 883, contacts 972 and 913, Fig. 9, winding of relay 930, battery.

In operating relay 930 causes the energization of magnet 970 of sender switch S3 and this magnet upon operating at 972 interrupts the circuit of relay 930. When this relay releases it in turn causes the deenergization of magnet 970 so that contact 972 recloses and the wipers of the sender switch are advanced from its home position to position 1. In this position a circuit is closed for relay 950 which may be traced from ground at contact 942 through wiper 991 and contact 1 in the A bank of switch S3, the winding of relay 950 to battery. Relay 950 upon operating at contact 951 causes the operating of relay 910 in the following circuit: ground, contact 951, first contact in the B bank and wiper 992 of sender switch S3, lower winding of relay 910, upper resistance winding of this relay, battery. At contact 952, relay 950 opens a point in the short circuiting path for the lower winding of relay 910, thereby preventing the periodic release of this relay by short circuiting, on special code alarms; and at contact 953, the relay locks to ground at contact 961 by way of contact 944. Upon operation relay 910 at contact 911 locks to ground on operating conductor 883. At 913 the relay transfers the operating ground on conductor 883 from the winding of interrupter relay 930 to the winding of interrupter relay 920 to condition the sender switch for slow stepping and at contact 914, relay 910 prepares the signalling circuit extending to code sounders 983, 984.

Interrupter relays 920 and 930 and magnet 970 accordingly interrupt each other to drive the sender switch through one complete revolution at a slow rate of speed. More specifically relay 920 operates causing the operation of relay 930 at its contact 921 while the closure of contact 922 is without effect on special code alarms. Each time relay 930 operates it causes at its contact 931 the energization of stepping magnet 970; and each time this last mentioned magnet is actuated it completes the signalling circuit at its contact 971 and at its contact 972 causes the successive release of relays 920 and 930 and magnet 970.

Shortly before the end of the revolution of sender switch S3, that is when the wipers of this switch reach position 24, relay 960 is operated over a circuit extending from ground at contact 942 through wiper 991 and the 24th contact in the A bank of sender switch S3 and the winding of relay 960 to battery. This last-mentioned relay in operating at contact 962 opens the code call sender operating circuit extending over conductors 828 and 883 thereby causing the release of relay 910 and at contact 961 opens the locking circuits of relay 940 and 950 so that these two relays restore. At contact 945, relay 940 in releasing opens the operating circuit of relay 840 but this relay remains in its operated condition due to off-normal contact 985 still being closed at this time; at its contact 941 relay 940 opens another point in the sender operating circuit extending over conductors 828 and 883 but the opening of contact 941 is not effective at this time due to the contact being bridged by off-normal springs 985*a*. Therefore when relay 960 releases again upon its circuit being opened at contact 942 of relay 940 contact 962 in reclosing again connects ground to the sender operating circuit by way of off-normal contact 985*a* and accordingly sender switch S3 is advanced to position 25 and from there to its home position. As relay 910 is in restored condition these two steps are taken at a fast rate and no signals are sent over conductor 988 during these two steps. When the switch reaches its home position the sender operating circuit extending over conductor 883 is opened at off-normal contact 985*a* and also at contact 843 of relay 840, the last mentioned relay being caused to restore due to its circuit being opened at off-normal contact 985.

If a regular code call is in process of transmission at the time special code alarm key 982 is depressed, relay 940 operates in response to the actuation of this key as described above. However, due to the fact that sender switch S3 is in the process of sending a regular code and, therefore, has passed its first position, relay 950 which is connected to the first A bank contact of this switch is kept from operating for the time being. When sender switch S3 upon completion of the code call cycle being sent reaches its home position, relay 840 is held from ground at contact 945 of relay 940 so that ground is maintained on operating conductor 883 by way of contacts 962 and 941, conductor 828 and contact 843, regardless of whether or not the special service apparatus is still in code calling condition. As a result sender switch S3 is stepped from its home position to position 1 at which time relay 950 operates in the circuit traced above. The sender now proceeds to transmit the special alarm code by going through a complete revolution in the manner above described and is stopped at the end of this revolution provided the subscriber originating the code call has abandoned his call in the meantime. On the other hand should this party still be on the line and the regular code call still be unanswered relays 830 and 840 would still be held from ground at contact 715, and sender switch S3 would accordingly be started for another regular code cycle under the control of marking conductors 891 to 895 and 896 to 890.

*Conference call from substation B′ to conference group 2*

As pointed out above the secretary at substation B′ is privileged to initiate code and conference calls but is not herself a member of any conference group. Yet the system described herein makes it possible for a conference call to be set up by the secretary at substation B′, for instance in behalf of the executive at station B. In the present instance it is assumed that the secretary at B′ wishes to establish a conference between the members of conference group 2, that is between the executives at B and C.

When the secretary at B′ lifts the handset off the cradle the finder of an idle link sets itself on the bank contacts terminating the calling line. The subscriber at B′ then dials the digit 1 into the connector and is thereby connected to the special service unit by way of special finder CF, Fig. 7, in the manner described above for a code call, the finder-connector link being released when special finder CF has been arrested on the calling line.

In order to establish a conference call to the second conference group, the subscriber at substation B′ now dials a 7 into the special service unit as the second digit, whereby selector switch S1 is advanced to its seventh position in the manner described above for a code call. No third digit is required in this case inasmuch as all conference call numbers are 2-digit numbers, namely 16 for group 1, 17 for group 2 and so on, the first digit 1 in each case serving to connect the calling party with the special service unit and the second digit functioning to position selector switch S1 to give access to conductor 262, 263, etc. depending on the conference group desired.

When relay 850 releases at the end of the series of 7 impulses, the following circuit is immediately closed to relay 850 by way of wiper 853 of switch S1 in position 7: Ground, contact 715, Fig. 7, conductor 792, contacts 823 and 851, Fig. 8, wiper 853, 7th contact in the C bank of switch S1, contact 848, winding of relay 840, battery. It will thus be seen that while in the case of a code call both relays 830 and 840 are operated, namely relay 830 at the end of the first digit and relay 840 at the end of the second digit of the code combination, relay 840 alone is operated in the case of a conference call, namely in immediate response to the completion of the group determining digit, i. e. the first and only digit dialed into the special service unit. Furthermore it will be understood that selector switch S2 is not moved out of its normal position 1 on conference calls.

When relay 840 operates it closes at 842 a substitute guarding ground to calling conductor 583; opens the homing circuits of the two selector switches at contacts 845 and 846, respectively; opens a point in the circuit of relay 850 at contact 847 to prevent reoperation of this relay; locks to ground by way of contact 751, conductor 792 and contacts 823, 849 independently of its above-traced operating circuit; and at its contact 844 causes the operation of conference group relay 275, Fig. 2, the circuit for this relay extending over wiper 855, in position 7 and the 7th contact in the A bank of switch S1 and conductor 263.

Relay 275 in operating at its contact 277, closes a circuit for cut-through relay 110, Fig. 1, and at contact 276 for cut-through relay 120, Fig. 1, the first of these circuits extending over contact 212, Fig. 2, and conductor 119, and the second circuit extending over contact 222 and conductor 129. Relay 110 upon operating at its contacts 118, 117 transfers control conductor 186 incoming from connector banks from the winding of relay 140 to direct ground thereby to guard the line equipment from seizure in an incoming call during a conference connection; and at contacts 113, 114 and 116, 115, transfers the line conductors leading to substation B from switchboard talking conductors 181, 184 to talking conductors 182, 183. As a result the following ringing circuit is closed for the bell at substation B: battery connected generator, not shown, Gen. conductor, Fig. 2, lower winding of ring cut-off relay 210, contact 214, conductor 182, contact 114, Fig. 1, condenser and ringer at substation B, ground. Similarly when relay 120 operates, it contacts 128, 127, cause control conductor 196 to be guarded and contacts 123, 124 and 126, 125 the line of substation C switched from switchboard talking conductors 191, 194 to conductors 192, 193. The result of this last mentioned switching operation is that the bell at substation C is rung in a circuit extending from battery connected generator, not shown, through the Gen. conductor, Fig. 2, lower winding of relay 220, contact 224, conductor 192, contact 124, Fig. 1, condenser and ringer at station C to ground.

Supposing that the executive at substation B is the first to respond to the sounding of his bell by lifting his receiver, a direct current loop is completed for ring cut-off relay 210 so that this relay operates in its first step by way of the following circuit: battery connected ringing generator, Gen. conductor, Fig. 2, lower winding of relay 210, contact 214, conductor 182, contact 114, Fig. 1, cradle springs, not shown, at station B, contact 115, conductor 183, contact 217, Fig. 2, ground. Relay 210 in thus operating in its first step locks to ground at contact 277, by way of its preliminary contact 212 and its upper winding. Relay 210 is thereby energized in its second step and in thus fully operating the relay at contacts 212, 211, transfers slow-release relay 110 from ground at contact 277 of relay 275 to contact 236 of battery feed relay 235; and at its contacts 214, 215 and 217, 216 switches the subscriber's line from battery and ground feed through the last mentioned loop circuit to battery and ground through the upper and lower windings of relay 235, respectively. Relay 235 upon operating at its contact 236 connects holding ground to the winding of relay 110; at its contacts 237 and 238 switches the line of substation B through to conference talking conductors 265 and 266 by way of condensers C13 and C14, respectively; and at contact 239 causes the operation of relay 860, Fig. 8, by way of conductor 264.

When the subscriber at station D answers the conference call next, his ring cut-off relay 220 is similarly operated to complete a locking circuit for itself at contact 223, switch relay 120 from its operating to its holding circuit at contacts 222, 221 and switch the battery feed for substation C at contacts 224, 225, and 227, 226. Consequently the battery feed relay of this subscriber, 240, also operates, completing the holding circuit of relay 120 at 241, switching the line of substation C through to conference talking path 265, 266 at contacts 242, 243; and closing a multiple ground to the winding of relay 860 at contact 244.

When relay 860 operates in response to the answering of the conference call by the first subscriber, B, it closes a multiple holding ground to the winding of relay 840 at contact 861; closes a holding circuit for itself extending through its contact 862 to ground at contact 811; closes a multiple ground to the winding of relay 820 at contact 863; causes the operation of relay 710 in a circuit extending from ground at contact 824 through contact 864, conductor 793 and the lower winding of relay 710 to battery; opens another point in the dial tone circuit at contact 865 and switches the calling party through to the conference talking path at contacts 866, 867. More specifically the secretary at station B′ is now connected with conference path 265, 266 by way of conductors 181, 184, the 13th contact in the two line banks of special finder CF, wipers 725, 726 in position 13 of this switch, switching contacts 815, 816 of relay 810 and switching contacts 866, 867 of relay 860. The executive at station B is connected to this conference talking path by way of switching contacts 114, 115, Fig. 1, conductors 182, 183, and switching contacts 215, 216, condensers C13, C14 and switching contacts 237 and 238, Fig. 2, and the executive at station C has connection to the conference talking path over switching contacts 124, 125, Fig. 1, conductors 192, 193, switching contacts 225, 226, condensers C15, C16 and switching contacts 242, 243, Fig. 2.

The secretary at station B′ can thus inform the individual members of the called conference group that they are being called into conference; subsequently the members of this group can converse with each other in conference connection. The calling party's transmitter receives its current supply through the windings of calling bridge relay 770, Fig. 7, and the transmitters of subscribers B and C are supplied with battery feed through the windings of relays 235 and 240, respectively. During the conference the calling access to the special service apparatus is guarded at contact 842 and since relay 710 also is operated as mentioned above the code call answering trunk is guarded at contact 712.

The release of the apparatus is under the joint control of the calling party at substation B′ and all the called parties that took part in the conference. Assuming that the secretary at B′ releases first, for instance when she withdraws from the conference connection upon ascertaining that all the members of the called conference group responded to the call, calling bridge relay 770, Fig. 7, releases in turn causing the release of relay 810. However, since relay 860 is held under the control of all the called parties, relay 820 is held at contact 863 of relay 860, in turn holding relays 710 and 760 by way of contact 824. Relay 840 also is held by way of contacts 861, 823 and 849. However, the locking circuit of relay 860 itself is opened at contact 811 upon the release of relay 810 and the connection between the calling party at station B' and the conference talking path 265, 266 is broken at contacts 815, 816. At contact 814 of relay 810, ground is removed from C wiper 727 of special finder CF so that the line and cut-off relay 140 associated with the calling line releases. This makes it possible for the secretary at station B' to make regular outgoing calls while the conference between the subscribers B and C is in progress.

At the end of the conference, that is after ground has been disconnected from conductor 264 at both contacts 239 and 244 upon the release of battery feed relays 235 and 240 of subscribers B and C, respectively, relay 860, Fig. 8, also releases thereby opening a multiple circuit through the lower winding of relay 710 at contact 864, opening the locking circuit of relay 840 at contact 861 and opening the circuit of relay 820 at 863. Relay 820 upon releasing at contact 824 causes the release of relays 710 and 760. With relay 820 restored the following homing circuit is closed for magnet 870 of selector switch S1: ground, B bank of switch S1, wiper 854 of this switch, contacts 821, 831, 871, winding of magnet 870, battery. When selector switch S1 has reached its home position the special service unit has returned to its normal condition. It will be understood that since relays 840 and 710 remain operated until all parties involved in the conference have released the special service calling point of access remains guarded at contact 842 and the code call answering trunk at contact 712 until that time.

Should all the called parties release before the calling party replaces the handset, relay 860 would be held by way of contacts 811 and 862 until relays 770 and 810 restore upon disconnection of the last mentioned party. The release of the special service unit then takes place substantially in the manner just described.

*Conference call from substation B to conference group 2*

If the executive at substation B places a conference call to group 2 himself the operation of the system is much like that described in the preceding section. However, when cut-through relay 110, Fig. 1, associated with substation B operates at the end of the second and last digit 7, the circuit of calling bridge relay 770 of the special service unit is immediately opened at contacts 113, 116, of relay 110. As a result relays 770 and 810 of the special service apparatus release already at this time. At contacts 815, 816 relay 810 upon releasing severs the connection between the line wipers 725, 726 of the special finder CF and conference talking path 265, 266; and at contact 814 the relay opens the circuit of line and cut-off relay 140 thereby enabling the party at substation B' to place regular calls while the conference is in progress.

Since in the present instance the handset at station B is already removed at the time relay 110 switches the ringing circuit through at contacts 114, 115, relays 210 and 235 operate immediately and hence the calling party at the last mentioned substation is at once connected to the conference talking path 265, 266 by way of contacts 114, 115, Fig. 1, conductors 182, 183, contacts 215, 216, condensers C13, C14 and contacts 237, 238. As soon as the other members such as C of the conference group respond to the conference call, the conference takes place over the aforementioned path and the circuit is now in the same condition as in the case of the preceding section after the secretary at B' withdraws from the connection. The release of the apparatus accordingly also takes place in the manner described above.

*Special code alarm initiated during a conference*

Should a fireman or other authorized attendant actuate special code alarm key 982 while a conference is in progress the code call sender, Fig. 9, operates substantially as described above without interrupting the conference. It will be noted that in the instant case relay 840, Fig. 8, is already operated at the time the special code alarm is started and that selector switch S1 is out of its normal position and, among the other relays involved in a conference call, relay 860 also is operated. No disturbance of the code call sender is caused due to the wipers of switch S1 being off-normal because on a conference call the switch is not in a code marking position; moreover during the transmission of the special alarm code relay 910 is permanently held in operated condition. It will be seen that by virtue of contacts 945 and 985 on the one hand and contact 861 on the other the release of relay 840 is under the joint control of the code call sender and the parties engaged in the conference call, that is relay 840 cannot restore until both the code call sender, Fig. 9, has returned to normal upon termination of the special code alarm and all the parties involved in the conference have disconnected. As a result the special service calling number remains guarded at contact 842 until both the special code alarm and the conference are terminated.

While a particular embodiment of this invention has been illustrated and described, it is to be understood that numerous modifications in the details of arrangement may be resorted to without departing from the true spirit and scope of the invention as defined in the appended claims.

What is claimed is:

1. In a telephone system a trunk line, a plurality of subscribers' lines including party lines of the side-of-line signaling type, a connector responsive to digital impulses sent under the control of a calling line to extend a call from the calling line to said trunk line or to a called subscriber's line, said connector comprising a first and second switch each having a stepping magnet and a set of wipers and contact rows, at least said first switch being a single motion switch, said trunk line being connected to a predetermined set of contacts of said first switch and the contact rows of said second switch giving access to a plurality of subscribers' lines, switching means for connecting said calling line to the wipers of said first switch, circuit connections between the wipers of said second switch and contacts of said first switch other than those of said predetermined set, control means effective upon said first switch being set on said predetermined set of contacts to connect said switching means to said trunk line by way of said wipers and contacts of said first switch only, and effective upon said first switch being set on one of said other sets of contacts to connect said switching means by way of the wipers and contacts of said first switch and said circuit connections with the wipers of said second switch and prepare a digital impulsing circuit for the magnet of said second switch, said last mentioned magnet being responsive to a succeeding series of digital impulses to advance the wipers of said second switch to a set of contacts leading to a desired subscriber's line, and means for applying ringing current to one of the talking wipers of said first switch, the talking wipers of said second switch being connected by way of said circuit connections to the talking contacts of said first switch in a straightforward or reverse way depending on the position of said first switch whereby party selection is effected in accordance with the setting of said first switch.

2. In a telephone system a trunk line, a plurality of subscribers' lines, a connector responsive to digital impulses sent under the control of a calling line to extend a call from the calling line to said trunk line or to a called subscriber's line, said connector comprising a first and a second switch each having a stepping magnet, at least said first switch being a single motion switch, said first switch having a set of wipers and contact rows, said trunk line being connected to a predetermined set of said contacts, and said second switch having a plurality of sets of wipers and contacts rows giving access to a plurality of groups of subscribers' lines respectively, switching means for connecting said calling line to the wipers of said first switch, circuit connections between the wipers of said second switch and contacts of said first switch other than those of said predetermined set, control means effective upon said first switch being set on said predetermined set of contacts to connect said switching means to said trunk line by way of said wipers and contacts of said first switch only, and effective upon said first switch being set on one of said other sets of contacts to connect said switching means by way of the wipers and contacts of said first switch and said circuit connections with a desired set of wipers of said second switch and prepare a digital impulsing circuit for the magnet of said second switch, said last-mentioned magnet being responsive to a succeeding series of digital impulses to advance the wipers of said second switch to a set of contacts leading to a desired subscriber's line.

3. In a telephone system a plurality of subscribers' lines, including party lines of the side-of-line signaling type, a connector responsive to digital impulses sent under the control of a calling line to extend a call from the calling line to a called subscriber's line, said connector comprising a first and a second stepping switch, at least said first switch being a single motion switch, said first switch having a set of wipers and contact rows and said second switch having a plurality of sets of wipers and contact rows giving access to a plurality of groups of subscribers' lines respectively, switching means for connecting said calling line to the wipers of said first switch, circuit connections between the contacts of said first switch and the wipers of said second switch, said first switch being set responsive to a series of said digital impulses to connect said switching means by way of the wipers and contacts of said first switch and said circuit connections with a predetermined set of wipers of said second switch, and said second switch being responsive to a succeeding series of digital impulses to advance its wipers to a set of contacts leading to a desired subscriber's line, and means for applying ringing current to one of the talking wipers of said first switch, the talking wipers of said second switch being connected by way of said circuit connections to the talking contacts of said first switch in a straight-forward or reverse way depending on the position of said first switch, whereby party selection is effected in accordance with the setting of said first switch.

4. In a telephone system a trunk line, a plurality of subscribers' lines including party lines of the side-of-line signaling type, a connector responsive to digital impulses sent under the control of a calling line to extend a call from the calling line to said trunk line or to a called subscriber's line, said connector comprising a first and a second switch each having a stepping magnet, said first switch having a set of wipers and contact rows, said trunk line being connected to a predetermined set of said contacts, and said second switch having a plurality of sets of wipers and contact rows giving access to a plurality of groups of subscribers' lines respectively, switching means for connecting said calling line to the wipers of said first switch, circuit connections between the wipers of said second switch and contacts of said first switch other than those of said predetermined set, control means effective upon said first switch being set on said pre-determined set of contacts to connect said switching means to said trunk line by way of said wipers and contacts of said first switch only, and effective upon said first switch being set on one of said other sets of contacts to connect said switching means by way of the wipers and contacts of said first switch and said circuit connections with a desired set of wipers of said second switch and prepare a digital impulsing circuit for the magnet of said second switch, said last-mentioned magnet being responsive to a succeeding series of digital impulses to advance the wipers of said second switch to a set of contacts leading to a desired subscriber's line, and means for applying ringing current to one of the talking wipers of said first switch, the talking wipers of said second switch being connected by way of said circuit connections to the talking contacts of said first switch in a straightforward or reverse way depending on the position of said first switch whereby party selection is effected in accordance with the setting of said first switch.

5. In a telephone system a plurality of subscribers' lines, including party lines of the side-of-line signaling type, a connector responsive to digital impulses sent under the control of a calling line to extend a call from the calling line to a called subscriber's line, said connector comprising a first and a second stepping switch each having a set of wipers and contacts rows, at least said first switch being a single motion switch, the contact rows of said second switch including a plurality of groups of contacts each group giving access to a corresponding group of subscribers' lines and being preceded by a start position of the last-mentioned switch, switching means for connecting said calling line to the wipers of said first switch, circuit connections between the contacts of said first switch and the wipers of said second switch, means for positioning said second switch on a desired one of said start positions, said first switch being set responsive to a series of said digital impulses to connect said switching means by way of the wipers and contacts of said first switch and said circuit connections with the wipers of said second switch and selectively make said positioning means operative, said second switch being responsive to a succeeding series of digital impulses to advance its wipers from said start position to a set of contacts leading to a desired line in said group, and means for applying ringing current to one of the talking wipers of said first switch, the talking wipers of said second switch being connected by way of said circuit connections to the talking contacts of said first switch in a straightforward or reverse way depending on the position of said first switch, whereby party selection is effected in accordance with the setting of said first switch.

6. In a telephone system a trunk line, a plurality of subscribers' lines including party lines of the side-of-line signaling type, a connnector responsive to digital impulses sent under the control of a calling line to extend a call from the calling line to said trunk or to a called subscriber's line, said connector comprising a first and second switch each having a stepping magnet and a set of wipers and contact rows, said trunk line being connected to a predetermined set of contacts of said first switch and the contact rows of said second switch including a plurality of groups of contacts, each group giving access to a corresponding group of subscribers' lines and being preceded by a start position of the last-mentioned switch, switching means for connecting said calling line to the wipers of said first switch, circuit connections between the wipers of said second switch and contacts of said first switch other than those of said predetermined set, an automatic stepping circuit for the magnet of said second switch, control means effective upon said first switch being set on said predetermined set of contacts to connect said switching means to said trunk line by way of said wipers and contacts of said first switch only, and effective upon said first switch being set on one of said other sets of contacts to connect said switching means by way of the wipers and contacts of said first switch and said circuit connections with the wipers of said second switch, selectively make said automatic stepping circuit effective to position said second switch on a desired one of said start positions and prepare a digital impulsing circuit for the magnet of said second switch, said last-mentioned magnet being responisve to a succeeding series of digital impulses to advance the wipers of said second switch from said start position to a set of contacts leading to a desired subscriber's line in said group, and means for applying ringing current to one of the talking wipers of said first switch, the talking wipers of said second switch being connected by way of said circuit connections to the talking contacts of said first switch in a straightforward or reverse way depending on the position of said first switch whereby party selection is effected in accordance with the setting of said first switch.

7. In a telephone system a plurality of subscriber's lines, a connector responsive to digital impulses sent under the control of a calling line to extend a call from the calling line to a called subscriber's line, said connector comprising a first and a second switch, at least said first switch being a single motion switch, said first switch having a set of wipers and contact rows and said second switch having a plurality of sets of wipers and contact rows, the contact rows of each set including a plurality of groups of contacts, each group giving access to a corresponding group of subscribers' lines and being preceded by a start position of the last-mentioned switch, switching means for connecting said calling line to the wipers of said first switch, circuit connections between the contacts of said first switch and the wipers of said second switch, means for positioning said second switch on a desired one of said start positions, said first switch being set responsive to a series of said digital impulses to connect said switching means by way of the wipers and contacts of said first switch and said circuit connections with a predetermined set of wipers of said second switch and to selectively make said positioning means operative, said second switch being responsive to a succeeding series of digital impulses to advance its wipers from said start poistion to a set of contacts leading to a deisred line in said group.

8. In a telephone system a trunk line, a plurality of subscribers' lines, a connector responsive to digital impulses sent under the control of a calling line to extend a call from the calling line to said trunk line or to a called subscriber's line, said connector comprising a first and a second switch each having a stepping magnet, said first switch having a set of wipers and contact rows, said trunk line being connected to a predetermined set of said contacts, and said second switch having a plurality of sets of wipers and contact rows, the contact rows of each of the last-mentioned sets including a plurality of groups of contacts, each group giving access to a corresponding group of subscribers' lines and being preceded by a start position of the last-mentioned switch, switching means for connecting said calling line to the wipers of said first switch, circuit connections between the wipers of said second switch and contacts of said first switch other than those of said predetermined set, an automatic stepping circuit for the magnet of said second switch, control means effective upon said first switch being set on said predetermined set of contacts to connect said switching means to said trunk line by way of said wipers and contacts of said first switch only, and effective upon said first switch being set on one of said other sets of contacts to connect said switching means by way of the wipers and contacts of said first switch and said circuit connections with a desired set of wipers of said second switch, selectively make said automatic stepping circuit effective to position said second switch on a desired one of said start positions and prepare a digital impulsing circuit for the magnet of said second switch, said last-mentioned magnet being responsive to a succeeding series of digital impulses to advance the wipers of said second switch from said start position to a set of contacts leading to a desired subscriber's line in said group.

9. In a telephone system a plurality of subscribers' line, including party lines of the side-of-line signaling type, a connector responsive to digital impulses sent under the control of a calling line to extend a call from the calling line to a called subscriber's line, said connector comprising a first and a second switch, said first switch having a set of wipers and contact rows and said second switch having a plurality of sets of wipers and contact rows, the contact rows of each set including a plurality of groups of contacts, each group giving access to a corresponding group of subscribers' lines and being preceded by a start position of the last-mentioned switch, switching means for connecting said calling line to the wipers of said first switch, circuit connections between the contacts of said first switch and the wipers of said second switch, means for positioning said second switch on a desired one of said start positions, said first switch being set responsive to a seires of said digital impulses to connect said switching mean by way of the wipers and contacts of said first switch and said circuit connections with a predetermined set of wipers of said second switch and to selectively make said positioning means operative, said second switch being responsive to a succeeding series of digital impulses to advance its wipers from said start position to a set of contacts leading to a desired line in said group, and means for applying ringing current to one of the talking wipers of said first switch, the talking wipers of said second switch being connected by way of said circuit connections to the talking contacts of said first switch in a straightforward or reverse way depending on the position of said first switch, whereby party selection is effected in accordance with the setting of said first switch.

10. In a telephone system a trunk line, a plurality of subscribers' lines including party lines of the side-of-line signaling type, a connector responsive to digital impulses sent under the control of a calling line to extend a call from the calling line to said trunk line or to a called subscriber's line, said connector comprising a first and a second switch each having a stepping magnet, said first switch having a set of wipers and contact rows, said trunk line being connected to a predetermined set of said contacts, and said second switch having a plurality of sets of wipers and contact rows, the contact rows of each of the last-mentioned sets including a plurality of groups of contacts, each group giving access to a corresponding group of subscribers' lines and being preceded by a start position of the last-mentioned switch, switching means for connecting said calling line to the wipers of said first switch, circuit connections between the wipers of said second switch and contacts of said first switch other than those of said predetermined set, an automatic stepping circuit for the magnet of said second switch, control means effective upon said first switch being set on said predetermined set of contacts to connect said switching means to said trunk line by way of said wipers and contacts of said first switch only, and effective upon said first switch being set on one of said other sets of contacts to connect said switching means by way of the wipers and contacts of said first switch and said circuit connections with a desired set of wipers of said second switch, selectively make said automatic stepping circuit effective to position said second switch on a desired one of said start positions and prepare a digital impulsing circuit for the magnet of said second switch, said last-mentioned magnet being responsive to a succeeding series of digital impulses to advance the wipers of said second switch from said start position to a set of contacts leading to a desired subscriber's line in said group, and means for applying ringing current to one of the talking wipers of said first switch, the talking wipers of said second switch being connected by way of said circuit connections to the talking contacts of said first switch in a straightforward or reverse way depending on the position of said first switch, whereby party selection is effected in accordance with the setting of said first switch.

No references cited.